United States Patent
Forbes, Jr.

(10) Patent No.: US 9,881,259 B2
(45) Date of Patent: Jan. 30, 2018

(54) SYSTEM AND METHOD FOR ESTIMATING AND PROVIDING DISPATCHABLE OPERATING RESERVE ENERGY CAPACITY THROUGH USE OF ACTIVE LOAD MANAGEMENT

(71) Applicant: Landis+Gyr Innovations, Inc., Alpharetta, GA (US)

(72) Inventor: Joseph W. Forbes, Jr., Wake Forest, NC (US)

(73) Assignee: LANDIS+GYR INNOVATIONS, INC., Alpharetta, GA (US)

(*) Notice: Subject to any disclaimer, the term of this patent is extended or adjusted under 35 U.S.C. 154(b) by 364 days.

(21) Appl. No.: 14/341,982

(22) Filed: Jul. 28, 2014

(65) Prior Publication Data

US 2014/0365025 A1    Dec. 11, 2014

Related U.S. Application Data

(62) Division of application No. 13/019,867, filed on Feb. 2, 2011, now Pat. No. 8,996,183.

(51) Int. Cl.
*G05B 15/02* (2006.01)
*G05F 1/66* (2006.01)
(Continued)

(52) U.S. Cl.
CPC ............ *G06Q 10/00* (2013.01); *G05B 15/02* (2013.01); *G05F 1/66* (2013.01); *H02J 3/14* (2013.01);
(Continued)

(58) Field of Classification Search
CPC . G05B 15/02; G05F 1/66; G06Q 10/00; H02J 2003/003; H02J 3/14; Y02B 70/3225; Y04S 10/54; Y04S 20/222; Y04S 20/224
(Continued)

(56) References Cited

U.S. PATENT DOCUMENTS 3,906,242 A  9/1975  Stevenson
4,023,043 A  5/1977  Stevenson
(Continued)

FOREIGN PATENT DOCUMENTS

EP    1729223 A2    12/2006
JP    2000078748 A   3/2000
(Continued)

OTHER PUBLICATIONS

Merriam-Webster Dictionary, "mobile".*
(Continued)

*Primary Examiner* — Yuhui R Pan
(74) *Attorney, Agent, or Firm* — Kilpatrick Townsend & Stockton LLP

(57) ABSTRACT

An active load management system (ALMS) is utilized to supply operating reserve to a utility. According to one embodiment, the ALMS determines amounts of power stored in power storage devices located at service points within the utility's service area, and stores the stored power data in a repository. The ALMS also determines an amount of available operating reserve based on at least the stored power data. When the utility needs operating reserve, the ALMS receives a request for operating reserve from the utility. The ALMS then manages a flow of power from the power storage devices to a power grid accessible by the utility responsive to the utility's request, taking into account the amount of available operating reserve. Determination of stored power data may be aided by reports received from control devices located at the service points, where the reports indicate amounts of power stored by the power storage devices.

16 Claims, 15 Drawing Sheets

(51) Int. Cl.
*G06Q 10/00* (2012.01)
*H02J 3/14* (2006.01)
*H02J 3/00* (2006.01)

(52) U.S. Cl.
CPC ..... *H02J 2003/003* (2013.01); *Y02B 70/3225* (2013.01); *Y04S 10/54* (2013.01); *Y04S 20/222* (2013.01); *Y04S 20/224* (2013.01)

(58) Field of Classification Search
USPC ........................................................ 700/295
See application file for complete search history.

(56) References Cited

U.S. PATENT DOCUMENTS

| | | |
|---|---|---|
| 4,077,061 A | 2/1978 | Johnston et al. |
| 4,589,075 A | 5/1986 | Buennagel |
| 4,799,059 A | 1/1989 | Grindahl et al. |
| 4,819,180 A | 4/1989 | Hedman et al. |
| 4,819,229 A | 4/1989 | Pritty et al. |
| 5,025,470 A | 6/1991 | Thornborough et al. |
| 5,193,111 A | 3/1993 | Matty et al. |
| 5,237,507 A | 8/1993 | Chasek |
| 5,361,982 A | 11/1994 | Liebl et al. |
| 5,388,101 A | 2/1995 | Dinkins |
| 5,481,546 A | 1/1996 | Dinkins |
| 5,495,239 A | 2/1996 | Ouellette |
| 5,502,339 A | 3/1996 | Hartig |
| 5,544,036 A | 8/1996 | Brown et al. |
| 5,553,094 A | 9/1996 | Johnson et al. |
| 5,570,002 A | 10/1996 | Castleman |
| 5,592,491 A | 1/1997 | Dinkins |
| 5,640,153 A | 1/1997 | Hildebrand et al. |
| 5,644,173 A | 7/1997 | Elliason et al. |
| 5,675,503 A | 10/1997 | Moe et al. |
| 5,682,422 A | 10/1997 | Oliver |
| 5,696,695 A | 12/1997 | Ehlers et al. |
| 5,721,936 A | 2/1998 | Kikinis et al. |
| 5,748,104 A | 5/1998 | Argyroudis et al. |
| 5,892,758 A | 4/1999 | Argyroudis |
| 5,926,776 A | 7/1999 | Glorioso et al. |
| 6,014,089 A | 1/2000 | Tracy et al. |
| 6,018,690 A | 1/2000 | Saito et al. |
| 6,047,274 A | 4/2000 | Johnson et al. |
| 6,078,785 A | 6/2000 | Bush |
| 6,102,487 A | 8/2000 | Ovrebo |
| 6,115,676 A | 9/2000 | Rector et al. |
| 6,122,603 A | 9/2000 | Budike, Jr. |
| 6,154,859 A | 11/2000 | Norizuki et al. |
| 6,178,362 B1 | 1/2001 | Woolard et al. |
| 6,185,483 B1 | 2/2001 | Drees |
| 6,216,956 B1 | 4/2001 | Ehlers et al. |
| 6,233,327 B1 | 5/2001 | Petite |
| 6,254,009 B1 | 7/2001 | Proffitt et al. |
| 6,304,552 B1 | 10/2001 | Chapman et al. |
| 6,374,101 B1 | 4/2002 | Gelbien |
| 6,437,692 B1 | 8/2002 | Petite et al. |
| 6,519,509 B1 | 2/2003 | Nierlich et al. |
| 6,535,797 B1 | 3/2003 | Bowles et al. |
| 6,577,962 B1 | 6/2003 | Afshari |
| 6,601,033 B1 | 7/2003 | Sowinski |
| 6,621,179 B1 | 9/2003 | Howard |
| 6,622,097 B2 | 9/2003 | Hunter |
| 6,622,925 B2 | 9/2003 | Carner et al. |
| 6,628,113 B2 | 9/2003 | Gallavan |
| 6,633,823 B2 | 10/2003 | Bartone et al. |
| 6,671,586 B2 | 12/2003 | Davis et al. |
| 6,681,154 B2 | 1/2004 | Nierlich et al. |
| 6,687,574 B2 | 2/2004 | Pietrowicz et al. |
| 6,718,177 B1 | 4/2004 | Comer et al. |
| 6,732,055 B2 | 5/2004 | Bagepalli et al. |
| 6,747,571 B2 | 6/2004 | Fierro et al. |
| 6,778,882 B2 | 8/2004 | Spool et al. |
| 6,784,807 B2 | 8/2004 | Petite et al. |
| 6,785,592 B1 | 8/2004 | Smith et al. |
| 6,787,807 B2 | 8/2004 | Petite et al. |
| 6,832,135 B2 | 12/2004 | Ying |
| 6,834,811 B1 | 12/2004 | Huberman et al. |
| 6,836,737 B2 | 12/2004 | Petite et al. |
| 6,862,498 B2 | 3/2005 | Davis et al. |
| 6,865,450 B2 | 3/2005 | Masticola et al. |
| 6,868,293 B1 | 3/2005 | Schurr et al. |
| 6,879,059 B2 | 4/2005 | Sleva |
| 6,882,498 B2 | 4/2005 | Kurumatani et al. |
| 6,891,838 B1 | 5/2005 | Petite et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,553 B1 | 7/2005 | Petite |
| 6,914,893 B2 | 7/2005 | Petite |
| 6,934,316 B2 | 8/2005 | Cornwall et al. |
| 6,946,972 B2 | 9/2005 | Mueller et al. |
| 6,961,641 B1 | 11/2005 | Forth et al. |
| 6,965,302 B2 | 11/2005 | Mollenkopf et al. |
| 6,965,303 B2 | 11/2005 | Mollenkopf |
| 6,980,090 B2 | 12/2005 | Mollenkopf |
| 6,980,091 B2 | 12/2005 | White, II et al. |
| 6,990,593 B2 | 1/2006 | Nakagawa |
| 6,998,962 B2 | 2/2006 | Cope et al. |
| 7,003,640 B2 | 2/2006 | Mayo et al. |
| 7,019,667 B2 | 3/2006 | Petite et al. |
| 7,035,719 B2 | 4/2006 | Howard et al. |
| 7,039,532 B2 | 5/2006 | Hunter |
| 7,051,332 B2 | 5/2006 | Gatto et al. |
| 7,053,767 B2 | 5/2006 | Petite et al. |
| 7,075,414 B2 | 7/2006 | Giannini et al. |
| 7,079,810 B2 | 7/2006 | Petite et al. |
| 7,088,014 B2 | 8/2006 | Nierlich et al. |
| 7,088,239 B2 | 8/2006 | Basinger et al. |
| 7,089,125 B2 | 8/2006 | Sonderegger |
| 7,103,511 B2 | 9/2006 | Petite |
| 7,123,994 B2 | 10/2006 | Weik et al. |
| 7,130,719 B2 | 10/2006 | Ehlers et al. |
| 7,133,750 B2 | 11/2006 | Raines et al. |
| 7,151,943 B2 | 12/2006 | Comer et al. |
| 7,177,728 B2 | 2/2007 | Gardner |
| 7,181,320 B2 | 2/2007 | Whiffen et al. |
| 7,184,861 B2 | 2/2007 | Petite |
| 7,200,134 B2 | 4/2007 | Proctor, Jr. et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,225,271 B1 | 5/2007 | DiBlasio et al. |
| 7,231,280 B2 | 6/2007 | Costa |
| 7,231,281 B2 | 6/2007 | Costa |
| 7,233,843 B2 | 6/2007 | Budhraja et al. |
| 7,245,212 B2 | 7/2007 | Cope et al. |
| 7,250,848 B2 | 7/2007 | White, II |
| 7,263,073 B2 | 8/2007 | Petite et al. |
| 7,274,975 B2 | 9/2007 | Miller |
| 7,283,580 B2 | 10/2007 | Cumeralto et al. |
| 7,289,887 B2 | 10/2007 | Rodgers |
| 7,295,128 B2 | 11/2007 | Petite |
| 7,301,440 B2 | 11/2007 | Mollenkopf |
| 7,305,282 B2 | 12/2007 | Chen |
| 7,313,465 B1 | 12/2007 | O'Donnell |
| 7,321,316 B2 | 1/2008 | Hancock et al. |
| 7,323,970 B1 | 1/2008 | Murray et al. |
| 7,333,880 B2 | 2/2008 | Brewster et al. |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Andrén et al. |
| 7,412,304 B2 | 8/2008 | Uenou |
| 7,424,527 B2 | 9/2008 | Petite |
| 7,440,871 B2 | 10/2008 | McConnell et al. |
| 7,451,019 B2 | 11/2008 | Rodgers |
| 7,468,661 B2 | 12/2008 | Petite et al. |
| 7,480,501 B2 | 1/2009 | Petite |
| 7,486,681 B2 | 2/2009 | Weber |
| 7,528,503 B2 | 5/2009 | Rognli et al. |

(56) References Cited

U.S. PATENT DOCUMENTS

| | | | |
|---|---|---|---|
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,639,157 B1 | 12/2009 | Whitley et al. |
| 7,650,425 B2 | 1/2010 | Davis et al. |
| 7,697,492 B2 | 4/2010 | Petite |
| 7,701,325 B2 | 4/2010 | White, II |
| 7,711,796 B2 | 5/2010 | Gutt et al. |
| 7,715,951 B2 | 5/2010 | Forbes, Jr. et al. |
| 7,738,999 B2 | 6/2010 | Petite |
| 7,739,378 B2 | 6/2010 | Petite |
| 7,880,599 B2 | 2/2011 | Murray et al. |
| 7,936,256 B2 | 5/2011 | Murray et al. |
| 8,010,812 B2 | 8/2011 | Forbes, Jr. et al. |
| 8,018,884 B2 | 9/2011 | Lee et al. |
| 8,032,233 B2 | 10/2011 | Forbes, Jr. et al. |
| 8,131,403 B2 | 3/2012 | Forbes, Jr. |
| 8,138,934 B2 | 3/2012 | Veillette et al. |
| 8,145,361 B2 | 3/2012 | Forbes, Jr. et al. |
| 8,203,463 B2 | 6/2012 | Bragg et al. |
| 8,253,549 B2 | 8/2012 | Murray et al. |
| 8,260,470 B2 | 9/2012 | Forbes, Jr. et al. |
| 8,307,225 B2 | 11/2012 | Forbes, Jr. et al. |
| 8,315,717 B2 | 11/2012 | Forbes, Jr. et al. |
| 8,390,221 B2 | 3/2013 | Jayanth et al. |
| 8,396,606 B2 | 3/2013 | Forbes, Jr. et al. |
| 8,527,107 B2 | 9/2013 | Forbes, Jr. et al. |
| 8,542,685 B2 | 9/2013 | Forbes, Jr. et al. |
| 8,856,323 B2 | 10/2014 | Enns et al. |
| 8,996,183 B2 | 3/2015 | Forbes, Jr. |
| 9,069,337 B2 | 6/2015 | Webb et al. |
| 2001/0025209 A1 | 9/2001 | Fukui et al. |
| 2001/0030468 A1 | 10/2001 | Anderson et al. |
| 2001/0038343 A1 | 11/2001 | Meyer et al. |
| 2002/0019802 A1 | 2/2002 | Malme et al. |
| 2002/0035496 A1 | 3/2002 | Fujushima et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2003/0009705 A1 | 1/2003 | Thelander et al. |
| 2003/0036820 A1 | 2/2003 | Yellepeddy |
| 2003/0040844 A1 | 2/2003 | Spool et al. |
| 2003/0063723 A1 | 4/2003 | Booth et al. |
| 2003/0074304 A1 | 4/2003 | Okada |
| 2003/0083980 A1 | 5/2003 | Satake |
| 2003/0144864 A1 | 7/2003 | Mazzarella |
| 2003/0171851 A1* | 9/2003 | Brickfield | H02J 3/008 |
| | | | 700/286 |
| 2003/0225483 A1 | 12/2003 | Santinato et al. |
| 2003/0229572 A1 | 12/2003 | Raines et al. |
| 2003/0233201 A1 | 12/2003 | Horst et al. |
| 2004/0006439 A1 | 1/2004 | Hunter |
| 2004/0088083 A1 | 5/2004 | Davis et al. |
| 2004/0095237 A1 | 5/2004 | Chen et al. |
| 2004/0117330 A1 | 6/2004 | Ehlers et al. |
| 2004/0128266 A1 | 7/2004 | Yellepeddy et al. |
| 2004/0153170 A1 | 8/2004 | Santacatterina et al. |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0230533 A1 | 11/2004 | Benco |
| 2005/0033481 A1 | 2/2005 | Budhraja et al. |
| 2005/0055432 A1 | 3/2005 | Rodgers |
| 2005/0065742 A1 | 3/2005 | Rodgers |
| 2005/0096856 A1 | 5/2005 | Lubkeman et al. |
| 2005/0096857 A1 | 5/2005 | Hunter |
| 2005/0116836 A1 | 6/2005 | Perry et al. |
| 2005/0125243 A1 | 6/2005 | Villalobos et al. |
| 2005/0138432 A1 | 6/2005 | Ransom et al. |
| 2005/0192711 A1 | 9/2005 | Raines et al. |
| 2005/0192713 A1 | 9/2005 | Weik et al. |
| 2005/0216302 A1 | 9/2005 | Raji et al. |
| 2005/0216580 A1 | 9/2005 | Raji et al. |
| 2005/0234600 A1 | 10/2005 | Boucher et al. |
| 2005/0240314 A1 | 10/2005 | Martinez |
| 2005/0240315 A1 | 10/2005 | Booth et al. |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2006/0020544 A1 | 1/2006 | Kaveski |
| 2006/0022841 A1 | 2/2006 | Hoiness et al. |
| 2006/0025891 A1 | 2/2006 | Budike, Jr. |
| 2006/0031934 A1 | 2/2006 | Kriegel |
| 2006/0064205 A1 | 3/2006 | Ying |
| 2006/0106635 A1 | 5/2006 | Ulrich et al. |
| 2006/0142900 A1 | 6/2006 | Rothman et al. |
| 2006/0142961 A1 | 6/2006 | Johnson et al. |
| 2006/0161450 A1 | 7/2006 | Carey et al. |
| 2006/0168191 A1 | 7/2006 | Ives |
| 2006/0195334 A1 | 8/2006 | Reeb et al. |
| 2006/0259199 A1 | 11/2006 | Gjerde et al. |
| 2006/0271214 A1 | 11/2006 | Brown |
| 2006/0271244 A1 | 11/2006 | Cumming et al. |
| 2006/0271314 A1 | 11/2006 | Hayes |
| 2007/0010914 A1 | 1/2007 | Johnson et al. |
| 2007/0021874 A1 | 1/2007 | Rognli et al. |
| 2007/0025249 A1 | 2/2007 | Yeom |
| 2007/0058453 A1 | 3/2007 | Shaffer et al. |
| 2007/0058629 A1 | 3/2007 | Luft |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0203722 A1 | 8/2007 | Richards et al. |
| 2007/0204176 A1 | 8/2007 | Shaffer et al. |
| 2007/0205915 A1 | 9/2007 | Shuey et al. |
| 2007/0213878 A1 | 9/2007 | Chen |
| 2007/0255457 A1 | 11/2007 | Whitcomb et al. |
| 2007/0286210 A1 | 12/2007 | Gutt et al. |
| 2007/0291644 A1 | 12/2007 | Roberts et al. |
| 2007/0299562 A1 | 12/2007 | Kates |
| 2008/0015975 A1 | 1/2008 | Ivchenko et al. |
| 2008/0015976 A1 | 1/2008 | Sandor et al. |
| 2008/0091625 A1 | 4/2008 | Kremen |
| 2008/0130673 A1 | 6/2008 | Cregg et al. |
| 2008/0147465 A1 | 6/2008 | Raines et al. |
| 2008/0165714 A1 | 7/2008 | Dettinger et al. |
| 2008/0172312 A1 | 7/2008 | Synesiou et al. |
| 2008/0177423 A1 | 7/2008 | Brickfield et al. |
| 2008/0177678 A1 | 7/2008 | Di Martini |
| 2008/0183523 A1 | 7/2008 | Dikeman |
| 2008/0201255 A1 | 8/2008 | Green |
| 2008/0224892 A1 | 9/2008 | Bogolea et al. |
| 2008/0228630 A1 | 9/2008 | Gotthelf et al. |
| 2008/0231114 A1 | 9/2008 | Tolnar et al. |
| 2008/0238710 A1 | 10/2008 | Tolnar et al. |
| 2008/0255899 A1 | 10/2008 | McConnell et al. |
| 2008/0275815 A1 | 11/2008 | Musier et al. |
| 2008/0281473 A1 | 11/2008 | Pitt |
| 2008/0281663 A1* | 11/2008 | Hakim | B60L 11/1824 |
| | | | 705/7.25 |
| 2009/0018884 A1 | 1/2009 | McConnell et al. |
| 2009/0043519 A1 | 2/2009 | Bridges et al. |
| 2009/0043520 A1 | 2/2009 | Pollack et al. |
| 2009/0055031 A1 | 2/2009 | Slota et al. |
| 2009/0062967 A1* | 3/2009 | Kressner | B60L 11/14 |
| | | | 700/286 |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0088991 A1 | 4/2009 | Brzezowski et al. |
| 2009/0106571 A1 | 4/2009 | Low et al. |
| 2009/0112758 A1 | 4/2009 | Herzig |
| 2009/0135836 A1 | 5/2009 | Veillette |
| 2009/0157510 A1 | 6/2009 | Pridmore et al. |
| 2009/0171975 A1 | 7/2009 | McConnell et al. |
| 2009/0177505 A1 | 7/2009 | Dietrich et al. |
| 2009/0177580 A1* | 7/2009 | Lowenthal | B60L 11/1824 |
| | | | 705/39 |
| 2009/0184689 A1 | 7/2009 | Kressner et al. |
| 2009/0187499 A1 | 7/2009 | Mulder et al. |
| 2009/0192894 A1 | 7/2009 | Dikeman |
| 2009/0210295 A1 | 8/2009 | Edholm et al. |
| 2009/0228320 A1 | 9/2009 | Lopez et al. |

(56) References Cited

U.S. PATENT DOCUMENTS

| | | |
|---|---|---|
| 2009/0228406 A1 | 9/2009 | Lopez et al. |
| 2009/0240381 A1 | 9/2009 | Lane |
| 2009/0265568 A1 | 10/2009 | Jackson |
| 2009/0313033 A1 | 12/2009 | Hafner et al. |
| 2009/0319091 A1 | 12/2009 | Flohr |
| 2010/0017249 A1* | 1/2010 | Fincham ............... B60L 3/12 705/412 |
| 2010/0023376 A1 | 1/2010 | Brown |
| 2010/0042420 A1 | 2/2010 | Hutchinson |
| 2010/0063832 A1 | 3/2010 | Brown |
| 2010/0076825 A1 | 3/2010 | Sato et al. |
| 2010/0079004 A1* | 4/2010 | Keefe ............... B60L 11/1842 307/80 |
| 2010/0106575 A1 | 4/2010 | Bixby et al. |
| 2010/0145534 A1 | 6/2010 | Forbes, Jr. et al. |
| 2010/0161148 A1 | 6/2010 | Forbes, Jr. et al. |
| 2010/0179670 A1 | 7/2010 | Forbes, Jr. et al. |
| 2010/0191862 A1 | 7/2010 | Forbes, Jr. et al. |
| 2010/0198713 A1 | 8/2010 | Forbes, Jr. et al. |
| 2010/0218010 A1 | 8/2010 | Musti et al. |
| 2010/0222935 A1 | 9/2010 | Forbes, Jr. et al. |
| 2010/0228601 A1 | 9/2010 | Vaswani et al. |
| 2010/0228861 A1 | 9/2010 | Arsovski et al. |
| 2010/0235008 A1 | 9/2010 | Forbes, Jr. et al. |
| 2010/0254290 A1 | 10/2010 | Gong et al. |
| 2011/0022239 A1 | 1/2011 | Forbes, Jr. |
| 2011/0029655 A1 | 2/2011 | Forbes, Jr. |
| 2011/0061014 A1 | 3/2011 | Frader-Thompson et al. |
| 2011/0063126 A1 | 3/2011 | Kennedy et al. |
| 2011/0082598 A1 | 4/2011 | Boretto et al. |
| 2011/0115302 A1 | 5/2011 | Slota et al. |
| 2011/0125422 A1 | 5/2011 | Goncalves Jota et al. |
| 2011/0133655 A1 | 6/2011 | Recker et al. |
| 2011/0133693 A1* | 6/2011 | Lowenthal ........ B60L 11/1824 320/109 |
| 2011/0144819 A1 | 6/2011 | Andrews et al. |
| 2011/0172837 A1 | 7/2011 | Forbes, Jr. |
| 2011/0172841 A1 | 7/2011 | Forbes, Jr. |
| 2011/0196546 A1 | 8/2011 | Muller et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0257809 A1 | 10/2011 | Forbes, Jr. et al. |
| 2011/0258022 A1 | 10/2011 | Forbes, Jr. et al. |
| 2012/0101932 A1 | 4/2012 | Slutsker et al. |
| 2013/0067253 A1* | 3/2013 | Tsuda ................... B60L 8/003 713/300 |
| 2013/0120881 A1 | 5/2013 | Jayanth et al. |
| 2013/0184888 A1 | 7/2013 | Forbes, Jr. et al. |
| 2014/0368353 A1 | 12/2014 | Forbes, Jr. et al. |

FOREIGN PATENT DOCUMENTS

| | | | |
|---|---|---|---|
| JP | 2001008380 A | 1/2001 | |
| JP | 2001306839 | 11/2001 | |
| JP | 2002133568 | 5/2002 | |
| JP | 2002133568 A | 5/2002 | |
| JP | 2002176729 A | 6/2002 | |
| JP | 2002281666 A | 9/2002 | |
| JP | 2003067457 A | 3/2003 | |
| JP | 2004248174 A | 2/2004 | |
| JP | 2004112868 A | 4/2004 | |
| JP | 2004180412 | 6/2004 | |
| JP | 2004301505 A | 10/2004 | |
| JP | 2006060911 A | 3/2006 | |
| JP | 2006277597 A | 10/2006 | |
| JP | 2007132553 A | 5/2007 | |
| JP | 3985390 B2 | 10/2007 | |
| JP | 2010081722 A | 4/2010 | |
| JP | 2010119269 A | 5/2010 | |
| JP | 2010183760 A | 8/2010 | |
| KR | 2005001584 A | 1/2005 | |
| KR | 20050045272 A | 5/2005 | |
| KR | 20060036171 A | 4/2006 | |
| KR | 20070008321 A | 1/2007 | |
| KR | 100701298 B1 | 3/2007 | |
| KR | 20070098172 A | 10/2007 | |
| KR | 20080112692 A | 12/2008 | |
| KR | 10-1277398 | 6/2013 | |
| WO | 03/049248 A2 | 6/2003 | |
| WO | 2005029243 A2 | 3/2005 | |
| WO | 2007136456 A2 | 11/2007 | |
| WO | 2008125696 A2 | 10/2008 | |
| WO | 2009032161 A2 | 3/2009 | |
| WO | 2009032162 A2 | 3/2009 | |
| WO | 2010129059 A1 | 11/2010 | |
| WO | 2010129958 A2 | 11/2010 | |
| WO | 2010132456 A2 | 11/2010 | |
| WO | 2010132469 A2 | 11/2010 | |
| WO | 2010132477 A2 | 11/2010 | |
| WO | 2010134987 A1 | 11/2010 | |
| WO | 2011043818 A2 | 4/2011 | |
| WO | 2011046589 A1 | 4/2011 | |
| WO | 2012106431 A1 | 8/2012 | |
| WO | 2012145102 A2 | 10/2012 | |

OTHER PUBLICATIONS

International Search Report and Written Opinion dated Feb. 25, 2009 issued by the Korean Intellectual Property Office as International Searching Authority in connection with related International Application No. PCT/US2008/010199 (7 pages).

Office Action dated Jul. 17, 2009, as entered in grandparent U.S. Appl. No. 11/895,909 (11 pages).

Amendment and Response dated Oct. 15, 2009, as filed in grandparent U.S. Appl. No. 11/895,909 (14 pages).

Notice of Allowability dated Dec. 23, 2009, as entered in grandparent U.S. Appl. No. 11/895,909 (4 pages).

Office Action dated May 19, 2010, as entered in parent U.S. Appl. No. 12/715,195 (10 pages).

Amendment and Response dated Jul. 19, 2010 as filed in parent U.S. Appl. No. 12/715,195 (20 pages).

International Search Report and Written Opinion dated Mar. 6, 2009 issued by the Korean Intellectual Property Office as International Searching Authority in connection with related International Application No. PCT/US2008/010200 (9 pages).

International Search Report and Written Opinion dated Jul. 15, 2010 issued by the United States Patent and Trademark Office as International Searching Authority in connection with related International Application No. PCT/US10/01354 (10 pages).

International Search Report and Written Opinion dated Jul. 23, 2010 issued by the United States Patent and Trademark Office as International Searching Authority in connection with related International Application No. PCT/US10/01489 (11 pages).

Michael Ahlheim and Friedrich Schneider, Allowing for Household Preferences in Emission Trading, A Contribution to the Climate Policy Debate, Environmental and Resource Economics, vol. 21, pp. 317-342, 2002 Kluwer Academic Publishers, Printed in the Netherlands (26 pages).

Olivier Rousse, Environmental and economic benefits resulting from citizens' participation in CO2 emissions trading: An efficient alternative solution to the voluntary compensation of CO2 emissions, Energy Policy 36 (2008), pp. 388-397 (10 pages).

Notice of Allowability dated Aug. 31, 2010, as entered in parent U.S. Appl. No. 12/715,124 (5 pages).

Notice of Allowability dated Sep. 8, 2010, as entered in parent U.S. Appl. No. 12/715,195 (4 pages).

B.J. Kirby, Spinning Reserve from Responsive Loads, Oak Ridge National Laboratory, United States Dept. of Energy, Mar. 2003 (54 pages).

Eric Hirst and Brendan Kirby, Opportunities for Demand Participation in New England Contingency-Reserve Markets, New England Demand Response Initiative, Feb. 2003 (15 pages).

Pablo A. Ruiz and Peter W. Sauer, Valuation of Reserve Services, IEEE Proceedings of the 41st Hawaii International Conference on System Sciences, 2008 (9 pages).

(56) References Cited

OTHER PUBLICATIONS

Eric Hirst and Richard Cowart, Demand Side Resources and Reliability, New England Demand Response Initiative, Mar. 20, 2002 (32 pages).

C.W. Gellings and W.M. Smith, Integrating Demand-Side Management into Utility Planning, Proceedings of the IEEE, vol. 77, Issue: 6, Jun. 1989, pp. 908-918 (Abstract only).

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

International Search Report and Written Opinion dated Nov. 30, 2010 issued by the Korean Intellectual Property Office as International Searching Authority in connection with related International Application No. PCT/US2010/034395 (8 pages).

International Search Report and Written Opinion dated Dec. 20, 2010 issued by the United States Patent and Trademark Office as International Searching Authority in connection with related International Application No. PCT/US10/02676 (20 pages).

International Search Report and Written Opinion dated Dec. 21, 2010 issued by the Korean Intellectual Property Office as International Searching Authority in connection with related International Application No. PCT/US2010/034247 (3 pages).

International Search Report and Written Opinion dated Dec. 22, 2010 issued by the Korean Intellectual Property Office as International Searching Authority in connection with related International Application No. PCT/US2010/034409 (4 pages).

International Search Report and Written Opinion dated Dec. 22, 2010 issued by the Korean Intellectual Property Office as International Searching Authority in connection with related International Application No. PCT/US2010/034418 (4 pages).

Office Action dated Jan. 7, 2011 as issued by the Australian Patent Office (Australian Government IP Australia) in connection with related Australian Application No. 2008296979 (2 pages).

Mashiro Inoue, Toshiyasu Higuma, Yoshiaki Ito, Noriyuki Kushiro and Hitoshi Kubota, Network Architecture for Home Energy Management System, IEEE Transactions on Consumer Electronics, vol. 49, Issue 3, Aug. 2003, pp. 606-613 (8 pages).

Paul Darbee, INSTEON The Details, Smarthouse, Inc., Aug. 11, 2005, 68 pages.

Paul Darbee, INSTEON Compared, SmartLabs, Inc., Jan. 2, 2006, 69 pages.

International Search Report and Written Opinion dated May 31, 2011 issued by the Korean Intellectual Property Office as International Searching Authority in connection with related International Application No. PCT/US2010/002709 (7 pages).

U.S. Patent and Trademark Office; Office Action dated Sep. 13, 2011 as entered in related U.S. Appl. No. 12/001,819 (18 pages).

U.S. Patent and Trademark Office; Office Action dated Jan. 3, 2012, as entered in related U.S. Appl. No. 12/702,768 (9 pages).

U.S. Patent and Trademark Office; Office Action dated Feb. 6, 2012, as entered in related U.S. Appl. No. 13/172,389 (9 pages).

U.S. Patent and Trademark Office; Notice of Allowability dated Jan. 25, 2012, as entered in related U.S. Appl. No. 12/702,640 (11 pages).

U.S. Patent and Trademark Office; Notice of Allowability dated Feb. 10, 2012, as entered in related U.S. Appl. No. 12/702,785 (10 pages).

U.S. Patent and Trademark Office; Office Action dated Mar. 9, 2012, as entered in related U.S. Appl. No. 12/783,415 (36 pages).

Amendment and Response dated Mar. 13, 2012, as filed in related U.S. Appl. No. 12/001,819 (21 pages).

The Patent Office of the People's Republic of China; Notification of the First Office Action dated Oct. 17, 2011, as entered in related Chinese Application No. 200880113530.X (9 pages).

The Patent Office of the People's Republic of China; Notification of the First Office Action dated Oct. 17, 2011, as entered in related Chinese Application No. 200880113529.7 (11 pages).

U.S. Patent and Trademark Office; Office Action dated Dec. 15, 2011, as entered in related U.S. Appl. No. 13/172,261 (8 pages).

Japanese Patent Office; Notification of First Office Action dated Mar. 21, 2012, as entered in related Japanese Application No. 2010522954 (10 pages).

Amendment and Response dated May 7, 2012, as filed in related U.S. Appl. No. 13/172,261 (30 pages).

Amendment and Response dated Apr. 2, 2012, as filed in related U.S. Appl. No. 12/702,768 (12 pages).

U.S. Patent and Trademark Office; Notice of Allowability dated May 2, 2012, as entered in related U.S. Appl. No. 12/702,768 (7 pages).

Amendment and Response dated May 7, 2012, as filed in related U.S. Appl. No. 13/172,389 (15 pages).

U.S. Patent and Trademark Office; Office Action dated Jun. 1, 2012, as entered in related U.S. Appl. No. 12/775,979 (6 pages).

Response to Examination Report dated Jun. 5, 2012, as filed in related Australian Patent Application No. 2008296979 (33 pages).

European Patent Office, Extended European Search Report (including Supplementary European Search Report and European Search Opinion) dated May 29, 2012, as issued in connection with related European Patent Application No. 08795673.6 (7 pages).

European Patent Office, Extended European Search Report (including Supplementary European Search Report and European Search Opinion) dated Jun. 1, 2012, as issued in connection with related European Patent Application No. 08795674.4 (6 pages).

U.S. Patent and Trademark Office; Notice of Allowability dated Jun. 5, 2012, as entered in related U.S. Appl. No. 13/172,261 (4 pages).

U.S. Patent and Trademark Office; Office Action dated May 18, 2012, as entered in related U.S. Appl. No. 12/001,819 (21 pages).

International Search Report and Written Opinion dated Jun. 22, 2012 issued by the Korean Intellectual Property Office as International Searching Authority in connection with related International Application No. PCT/US2012/023488 (8 pages).

Patent Examination Report No. 3 dated Jul. 6, 2012 from the Australian Patent Office (Australian Government IP Australia) in connection with related Australian Application No. 2008296979 (4 pages)

Decision of Rejection dated Jul. 31, 2012 by the Japanese Patent Office in connection with related Japanese Application No. 2010-522953 (2 pages).

Amendment and Response dated Sep. 4, 2012, as filed in related U.S. Appl. No. 12/775,979 (7 pages).

Amendment and Response dated Sep. 10, 2012, as filed in related U.S. Appl. No. 12/783,415 (40 pages).

International Search Report and Written Opinion dated Oct. 30, 2012 issued by the Korean Intellectual Property Office as International Searching Authority in connection with related International Application No. PCT/US2012/029339 (13 pages).

Korean Intellectual Property Office, Second Notification of Provisional Rejection dated Oct. 31, 2012, as entered in related Korean Application No. 10-2010-7006801 (5 pages).

The Patent Office of the People's Republic of China; Notification of the Second Office Action dated Oct. 29, 2012, as entered in related Chinese Application No. 200880113530.X (9 pages).

Mexican Institute of Industrial Property, Official Action dated Nov. 9, 2012, as entered in related Mexican Application No. MX/a/2011/011824 (2 pages).

(56) References Cited

OTHER PUBLICATIONS

Korean Intellectual Property Office, Notification of Provisional Rejection dated Nov. 23, 2012, as entered in related Korean Application No. 10-2011-7029409 (3 pages).
The Patent Office of the People's Republic of China; Notification of the Second Office Action dated Oct. 26, 2012, as entered in related Chinese Application No. 200880113529.7 (7 pages).
Korean Intellectual Property Office, Second Notification of Provisional Rejection dated Oct. 22, 2012, as entered in related Korean Application No. 10-2012-7001804 (1 page).
Korean Intellectual Property Office, Notification of Provisional Rejection dated Dec. 14, 2012, as entered in related Korean Application 10-2011-7030546 (2 pages).
U.S. Patent and Trademark Office; Final Office Action dated Jan. 4, 2013, as entered in related U.S. Appl. No. 12/783,415 (39 pages).
Amendment and Response dated Apr. 17, 2013, as filed in related European Patent Application No. 08795674.4 (20 pages).
Japanese Patent Office, Decision of Rejection dated Feb. 5, 2013, as entered in related Japanese Application No. 2010-522953 (3 pages).
Korean Intellectual Property Office, Notification of Provisional Rejection dated Apr. 19, 2013, as entered in related Korean Application No. 10-2012-7012538 (4 pages).
The Patent Office of the People's Republic of China; Notification of the Third Office Action dated Jun. 9, 2013, as entered in related Chinese Application No. 200880113529.7 (7 pages).
Amendment, Response and Argument dated Jul. 13, 2013, as filed in related Japanese Patent Application No. 2010-522953 (17 pages).
Korean Intellectual Property Office, Notification of Provisional Rejection dated Aug. 8, 2013, as entered in related Korean Application No. 10-2011-7029409 (4 pages).
European Patent Office, Extended European Search Report (including Supplementary European Search Report and European Search Opinion) dated Jul. 31, 2013, as issued in connection with related European Patent Application No. 10822357.9 (9 pages).
The Patent Office of the People's Republic of China; Notification of the Third Office Action dated Jun. 9, 2013, as entered in related Chinese Application No. 20088011113530.X (9 pages).
Canadian Intellectual Property Office, Office Action dated Apr. 4, 2013, as entered in related Canadian Application No. 2,698,348 (3 pages).
Canadian Intellectual Property Office, Office Action dated May 17, 2013, as entered in related Canadian Application No. 2,698,098 (2 pages).
Amendment and Response dated Apr. 18, 2013 as filed in related Japanese Patent Application No. 2010-522954 (10 pages).
U.S. Patent and Trademark Office; Office Action dated Oct. 2, 2013, as entered in related U.S. Appl. No. 12/900,884 (16 pages).
U.S. Patent and Trademark Office; Office Action dated Jan. 15, 2014, as entered in related U.S. Appl. No. 12/900,884 (10 pages).
Japanese Patent Office; Notification of First Office Action dated Jan. 21, 2014, as entered in related Japanese Application No. 2012-260104 (document provides Japanese Patent Office's interpretation of several paragraphs of JP 2002-133568A) (3 pages).
Korean Intellectual Property Office, Notification of Provisional Rejection dated Jan. 24, 2014, as entered in related Korean Application No. 10-2012-7011990 (Korean counterpart to U.S. Appl. No. 12/900,884) (3 pages).
U.S. Patent and Trademark Office; Office Action dated Jan. 29, 2014, as entered in related U.S. Appl. No. 12/001,819 (21 pages).
Canadian Intellectual Property Office, Office Action dated Mar. 18, 2015, as entered in counterpart Canadian Application No. 2,826,431 (3 pages).
Amendment and Response dated Sep. 18, 2014, as filed in U.S. Appl. No. 13/019,867 (7 pages).
Australian Patent Office, Patent Examination Report No. 1 dated Sep. 22, 2014, as issued in connection with counterpart Australian Patent Application No. 2012212224 (3 pages).
U.S. Patent and Trademark Office; Office Action dated Jul. 24, 2015, as entered in related U.S. Appl. No. 14/444,018 (8 pages).
Amendment and Response dated Oct. 23, 2015, as filed in related U.S. Appl. No. 14/444,018 (6 pages).
Canadian Intellectual Property Office, Office Action dated Mar. 13, 2014, as issued in connection with related Canadian Application No. 2,698,098 (4 pages).
Canadian Intellectual Property Office, Office Action dated May 27, 2015, as issued in connection with related Canadian Application No. 2,698,098 (4 pages).
Canadian Intellectual Property Office, Office Action dated Oct. 30, 2014, as issued in connection with related Canadian Application No. 2,698,348 (3 pages).
Australian Patent Office, Patent Examination Report No. 1 dated Aug. 29, 2014, as issued in connection with related Australian Patent Application No. 2012230096 (4 pages).
Australian Patent Office, Patent Examination Report No. 2 dated Jul. 13, 2015, as issued in connection with related Australian Patent Application No. 2012230096 (5 pages).
Australian Patent Office, Patent Examination Report No. 1 dated Oct. 7, 2014, as issued in connection with related Australian Patent Application No. 2012246665 (4 pages).
Australian Patent Office, Patent Examination Report No. 1 dated May 6, 2015, as issued in connection with related Australian Patent Application No. 2010247777 (3 pages).
U.S. Patent and Trademark Office; Office Action dated Nov. 2, 2012, as entered in related U.S. Appl. No. 12/702,554 (14 pages).
Mexican Institute of Industrial Property, Official Action dated Oct. 21, 2015, as issued in connection with counterpart Mexican Patent Application No. Mx/a/2014/009754 (2 pages).
Canada Patent Application No. 2,904,829, "Office Action", dated Oct. 26, 2016, 6 pages.

\* cited by examiner

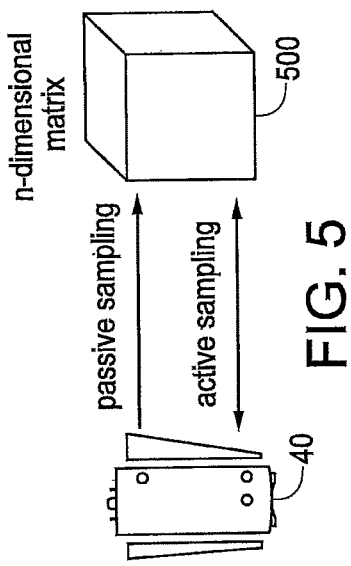

FIG. 5

| New Program: | | |
|---|---|---|
| Step 3: Manage HVAC | Cancel Setup | Previous Step | Next Step |

For this device when using this program . . .

What do you consider a comfortable temperature?   70.0 °F ◁▷

What temperature would you turn it to when no one is at home?   70.0 °F ◁▷

What temperature would you turn it to when everyone is sleeping?   70.0 °F ◁▷

What is the minimum temperature you would want to experience?   60.0 °F ◁▷

What is the maximum temperature you would want to experience?   80.0 °F ◁▷

Show Details

FIG. 6

| New Program: |  |  |  |
|---|---|---|---|
| Step 2: Manage Water Heater | Cancel Setup | Previous Step | Next Step |

For this device when using this program . . .

At what state would you normally leave the device at when you wake up?   ⦿ ON   ○ OFF At what state would you normally leave the device at when the first person in your household returns home?   ⦿ ON   ○ OFF At what state would you normally leave the device at when no one is at home?   ○ ON   ⦿ OFF At what state would you normally leave the device at when everyone is sleeping?   ○ ON   ⦿ OFF Show Details

SYSTEM AND METHOD FOR ESTIMATING AND PROVIDING DISPATCHABLE OPERATING RESERVE ENERGY CAPACITY THROUGH USE OF ACTIVE LOAD MANAGEMENT

CROSS REFERENCE TO RELATED APPLICATIONS

This application is a division of co-pending U.S. application Ser. No. 13/019,867 filed on Feb. 2, 2011, which application is incorporated herein by this reference as if fully set forth herein. U.S. application Ser. No. 13/019,867 is a continuation-in-part of U.S. application Ser. No. 12/715,124 filed on Mar. 1, 2010, now U.S. Pat. No. 8,010,812, which is a division of U.S. application Ser. No. 11/895,909 filed on Aug. 28, 2007, now U.S. Pat. No. 7,715,951, and is incorporated herein by this reference as if fully set forth herein. U.S. application Ser. No. 13/019,867 is also a continuation-in-part of U.S. application Ser. No. 12/715,195 filed on Mar. 1, 2010, now U.S. Pat. No. 8,032,233, which is a division of U.S. application Ser. No. 11/895,909 filed on Aug. 28, 2007, now U.S. Pat. No. 7,715,951, and is incorporated herein by this reference as if fully set forth herein. U.S. application Ser. No. 13/019,867 is further a continuation-in-part of U.S. application Ser. No. 12/001,819 filed on Dec. 13, 2007, which application is incorporated herein by this reference as if fully set forth herein. U.S. application Ser. No. 13/019,867 is further a continuation-in-part of U.S. application Ser. No. 12/775,979 filed on May 7, 2010, now U.S. Pat. No. 8,396,606, which application is incorporated herein by this reference as if fully set forth herein. U.S. application Ser. No. 12/775,979 is a continuation-in-part of U.S. application Ser. No. 11/895,909, now U.S. Pat. No. 7,715,951, and U.S. application Ser. No. 12/001,819, and claims priority under 35 U.S.C. §119(e) upon U.S. Provisional Application No. 61/215,725 filed on May 8, 2009, solely and exclusively to the extent of the subject matter disclosed in said provisional application. U.S. application Ser. No. 13/019,867 is further a continuation-in-part of U.S. application Ser. No. 12/783,415 filed on May 19, 2010, now abandoned, which application is incorporated herein by this reference as if fully set forth herein. U.S. application Ser. No. 12/783,415 is a continuation-in-part of U.S. application Ser. No. 12/715,124, now U.S. Pat. No. 8,010,812, and U.S. application Ser. No. 12/001,819, and claims priority under 35 U.S.C. §119(e) upon U.S. Provisional Application No. 61/216,712 filed on May 20, 2009, solely and exclusively to the extent of the subject matter disclosed in said provisional application. Finally, U.S. application Ser. No. 13/019,867 is a continuation-in-part of U.S. application Ser. No. 12/896,307 filed on Oct. 1, 2010, now U.S. Pat. No. 8,527,107, which application is incorporated herein by this reference as if fully set forth herein. U.S. application Ser. No. 12/896,307 is a continuation-in-part of U.S. application Ser. No. 12/715,124, now U.S. Pat. No. 8,010,812, U.S. application Ser. No. 12/715,195, now U.S. Pat. No. 8,032,233, and U.S. application Ser. No. 12/702,640 filed on Feb. 9, 2010, now U.S. Pat. No. 8,131,403, and claims priority under 35 U.S.C. §119(e) upon U.S. Provisional Application No. 61/279,072 filed on Oct. 15, 2009, solely and exclusively to the extent of the subject matter disclosed in said provisional application. U.S. application Ser. No. 12/702,640 is a continuation-in-part of U.S. application Ser. No. 11/895,909, now U.S. Pat. No. 7,715,951, and claims priority under 35 U.S.C. §119(e) upon U.S. Provisional Application No. 61/150,978 filed on Feb. 9, 2009 and U.S. Provisional Application No. 61/176,752 filed on May 8, 2009, solely and exclusively to the extent of the subject matter disclosed in said provisional applications.

BACKGROUND OF THE INVENTION

Field of the Invention

The present invention relates generally to the field of electric power supply and generation systems and, more particularly, to a system and method for estimating and/or providing dispatchable operating reserve energy capacity for an electric utility using active load management so that the reserve capacity may be made available to the utility or to the general power market (e.g., via a national grid).

Description of Related Art

Energy demand within a utility's service area varies constantly. Such variation in demand can cause undesired fluctuations in line frequency if not timely met. To meet the varying demand, a utility must adjust its supply or capacity (e.g., increase capacity when demand increases and decrease supply when demand decreases). However, because power cannot be economically stored, a utility must regularly either bring new capacity on-line or take existing capacity off-line in an effort to meet demand and maintain frequency. Bringing new capacity online involves using a utility's reserve power, typically called "operating reserve." A table illustrating a utility's typical energy capacity is shown in FIG. 1. As shown, operating reserve typically includes three types of power: so-called "regulating reserve," "spinning reserve," and "non-spinning reserve" or "supplemental reserve." The various types of operating reserve are discussed in more detail below.

Normal fluctuations in demand, which do not typically affect line frequency, are responded to or accommodated through certain activities, such as by increasing or decreasing an existing generator's output or by adding new generating capacity. Such accommodation is generally referred to as "economic dispatch." A type of power referred to as "contingency reserve" is additional generating capacity that is available for use as economic dispatch to meet changing (increasing) demand. Contingency reserve consists of two of the types of operating reserve, namely, spinning reserve and non-spinning reserve. Therefore, operating reserve generally consists of regulating reserve and contingency reserve.

As shown in FIG. 1, spinning reserve is additional generating capacity that is already online (e.g., connected to the power system) and, thus, is immediately available or is available within a short period of time after a determined need (e.g., within ten (10) to fifteen (15) minutes, as defined by the applicable North American Electric Reliability Corporation (NERC) regulation). More particularly, in order for contingency reserve to be classified as "spinning reserve," the reserve power capacity must meet the following criteria:
  a) be connected to the grid;
  b) be measurable and verifiable; and
  c) be capable of fully responding to load typically within 10-15 minutes of being dispatched by a utility, where the time-to-dispatch requirements of the spinning reserve are generally governed by a grid system operator or other regulatory body, such as NERC.

Non-spinning reserve (also called supplemental reserve) is additional generating capacity that is not online, but is required to respond within the same time period as spinning reserve. Typically, when additional power is needed for use as economic dispatch, a power utility will make use of its spinning reserve before using its non-spinning reserve because (a) the generation methods used to produce spinning reserve capacity typically tend to be cheaper than the methods, such as one-way traditional demand response, used to produce non-spinning reserve or (b) the consumer impact to produce non-spinning reserve is generally less desirable than the options used to produce spinning reserve due to other considerations, such as environmental concerns. For example, spinning reserve may be produced by increasing the torque of rotors for turbines that are already connected to the utility's power grid or by using fuel cells connected to the utility's power grid; whereas, non-spinning reserve may be produced from simply turning off resistive and inductive loads such as heating/cooling systems attached to consumer locations. However, making use of either spinning reserve or non-spinning reserve results in additional costs to the utility because of the costs of fuel, incentives paid to consumers for traditional demand response, maintenance, and so forth.

If demand changes so abruptly and quantifiably as to cause a substantial fluctuation in line frequency within the utility's electric grid, the utility must respond to and correct for the change in line frequency. To do so, utilities typically employ an Automatic Generation Control (AGC) process or subsystem to control the utility's regulating reserve. To determine whether a substantial change in demand has occurred, each utility monitors its Area Control Error (ACE). A utility's ACE is equal to the difference in the scheduled and actual power flows in the utility grid's tie lines plus the difference in the actual and scheduled frequency of the supplied power multiplied by a constant determined from the utility's frequency bias setting. Thus, ACE can be written generally as follows:

$$ACE = (NI_A - NI_S) + (-10 B_1)(F_A - F_S),\quad\quad\text{[Equation 1]}$$

where
$NI_A$ is the sum of actual power flows on all tie lines,
$NI_S$ is the sum of scheduled flows on all tie lines,
$B_1$ is the frequency bias setting for the utility,
$F_A$ is the actual line frequency, and
$F_S$ is the scheduled line frequency (typically 60 Hz).

In view of the foregoing ACE equation, the amount of loading relative to capacity on the tie lines causes the quantity ($NI_A - NI_S$) to be either positive or negative. When demand is greater than supply or capacity (i.e., the utility is under-generating or under-supplying), the quantity ($NI_A - NI_S$) is negative, which typically causes ACE to be negative. On the other hand, when demand is less than supply, the quantity ($NI_A - NI_S$) is positive (i.e., the utility is over-generating or over-supplying), which typically causes ACE to be positive. The amount of demand (e.g., load) or capacity directly affects the quantity ($NI_A - NI_S$); thus, ACE is a measure of generation capacity relative to load. Typically, a utility attempts to maintain its ACE very close zero using AGC processes.

If ACE is not maintained close to zero, line frequency can change and cause problems for power consuming devices attached to the electric utility's grid. Ideally, the total amount of power supplied to the utility tie lines must equal the total amount of power consumed through loads (power consuming devices) and transmission line losses at any instant of time. However, in actual power system operations, the total mechanical power supplied by the utility's generators is seldom exactly equal to the total electric power consumed by the loads plus the transmission line losses. When the power supplied and power consumed are not equal, the system either accelerates (e.g., if there is too much power in to the generators) causing the generators to spin faster and hence to increase the line frequency or decelerates (e.g., if there is not enough power into the generators) causing the line frequency to decrease. Thus, variation in line frequency can occur due to excess supply, as well as due to excess demand.

To respond to fluctuations in line frequency using AGC, a utility typically utilizes "regulating reserve," which is one type of operating reserve as illustrated in FIG. 1. Regulating reserve is used as needed to maintain constant line frequency. Therefore, regulating reserve must be available almost immediately when needed (e.g., in as little as a few seconds to less than about five (5) minutes). Governors are typically incorporated into a utility's generation system to respond to minute-by-minute changes in load by increasing or decreasing the output of individual generators and, thereby, engaging or disengaging, as applicable, the utility's regulating reserve.

The Federal Energy Reliability Commission (FERC) and NERC have proposed the concept of Demand Side Management (DSM) as an additional approach to account for changes in demand. DSM is a method in which a power utility carries out actions to reduce demand during peak periods. Examples of DSM include encouraging energy conservation, modifying prices during peak periods, direct load control, and others.

Current approaches for using DSM to respond to increases in demand have included using one way load switches that interrupt loads, as well as statistics to approximate the average amount of projected load removed by DSM. A statistical approach is employed because of the utility's inability to measure the actual load removed from the grid as a result of a DSM load control event. In addition, current DSM approaches have been limited to use of a single power measuring meter among every one hundred (100) or more service points (e.g., residences and/or businesses). Accordingly, current DSM approaches are inadequate because they rely on statistical trends and sampling, rather than on empirical data, to make projections and measure actual load removal events.

More recently, FERC and NERC have introduced the concept of flexible load-shape programs as a component of DSM. These programs allow customers to make their preferences known to the utility concerning timing and reliability of DSM load control events. However, DSM approaches utilizing load-shaping programs do not meet all of the criteria for implementing regulating reserve or spinning reserve, such as being dispatchable within 15 minutes or less. Additionally, in order for a generating source to be considered dispatchable energy, it must be forecasted twenty-four (24) hours prior to being delivered to a utility. Current DSM approaches do not facilitate accurate forecasting twenty-four (24) hours in advance due to their heavy reliance on statistics.

Therefore, there is a need for utilities to be able to create operating reserve, especially regulating and/or spinning reserve, by using accurate forecasting and flexible load shaping techniques. There is a further need to involve the consumer in a two-way approach in which the consumer can make their energy consumption preferences known and the utility can make use of those preferences to respond to increased demand and maintain line frequency regulation.

BRIEF DESCRIPTION OF THE DRAWINGS

FIG. 5 is a block diagram illustrating generation of an exemplary sampling repository at the active load director of FIG. 4 or some other location in an electric utility.

FIG. 6 is a screen shot of an exemplary web browser interface through which a customer may designate his or her device performance and energy saving preferences for an environmentally-dependent, power consuming device in accordance with one embodiment of the present invention.

FIG. 7 is a screen shot of an exemplary web browser interface through which a customer may designate his or her device performance and energy saving preferences for an environmentally-independent, power consuming device in accordance with another embodiment of the present invention.

DETAILED DESCRIPTION

Figure 1:
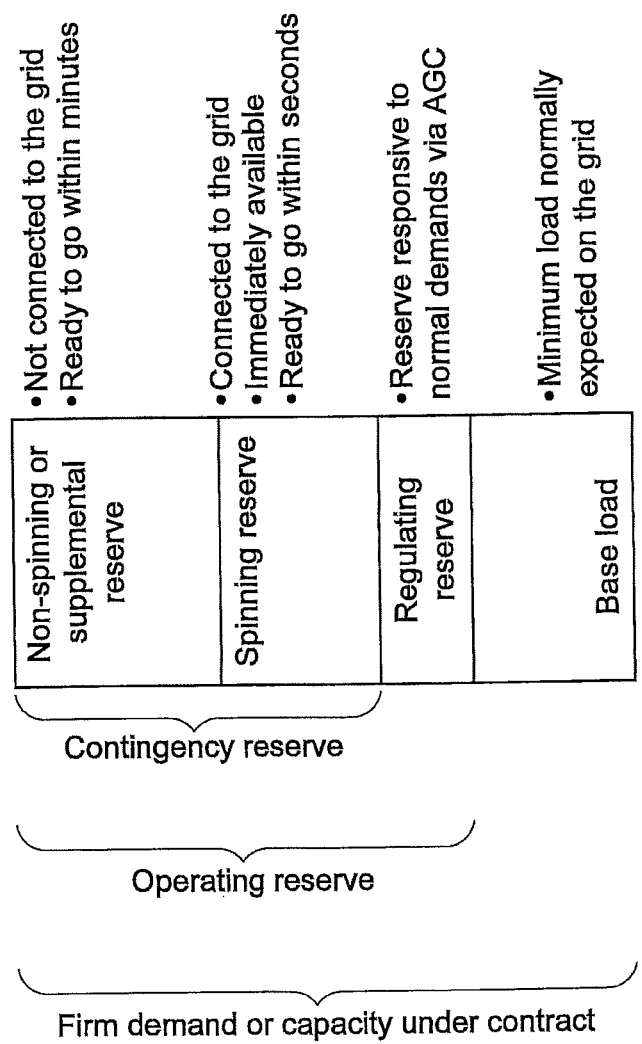
FIG. 1 is a table showing the base load power requirements and operating reserve available to an electric power utility.

Before describing in detail exemplary embodiments that are in accordance with the present invention, it should be observed that the embodiments reside primarily in combinations of apparatus components and processing steps related to actively monitoring and managing power loading at an individual service point (e.g., on an individual subscriber basis) and throughout a utility's service area, as well as determining available or dispatchable operating reserve power derived from projected power savings resulting from monitoring and management of power loading. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," and any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

Additionally, the term "ZigBee" refers to any wireless communication protocol adopted by the Institute of Electronics & Electrical Engineers (IEEE) according to standard 802.15.4 or any successor standard(s), and the term "Bluetooth" refers to any short-range communication protocol implementing IEEE standard 802.15.1 or any successor standard(s). The term "High Speed Packet Data Access (HSPA)" refers to any communication protocol adopted by the Third Generation Partnership Project (3GPP), the Telecommunications Industry Association (TIA), the International Telecommunication Union (ITU), or another mobile telecommunications standards body referring to the evolution of the Global System for Mobile Communications (GSM) standard beyond its third generation Universal Mobile Telecommunications System (UMTS) protocols (e.g., 3GPP Release 7 or later). The term "Long Term Evolution (LTE)" refers to any communication protocol adopted by the Third Generation Partnership Project (3GPP), the TIA, the ITU or another mobile telecommunications standards body referring to the evolution of GSM-based networks to voice, video and data standards anticipated to be replacement protocols for HSPA (e.g., 3GPP Release 8 or later). The term "Code Division Multiple Access (CDMA) Evolution Date-Optimized (EVDO) Revision A (CDMA EVDO Rev. A)" refers to the communication protocol adopted by the ITU under standard number TIA-856 Rev. A. The term "GPS" means the Global Positioning System, as well understood in the art, and any positioning unit or software used in connection therewith.

The terms "utility," "electric utility," "power utility," and "electric power utility" refer to any entity that generates and/or distributes electrical power to its customers, that purchases power from a power-generating entity and distributes the purchased power to its customers, or that supplies electricity created either actually or virtually by alternative energy sources, such as solar power, wind power, load control, or otherwise, to power generation or distribution entities through the FERC electrical grid or otherwise. Thus, a utility may include a power generating utility, a municipality, an electric cooperative, an independent system operator (ISO), a grid operator, a regional transmission organization (RTO), or a virtual utility that supplies at least some power virtually through load deferment or other non-delivery mechanisms. The terms "energy" and "power" are used interchangeably herein. The terms "operating reserve," "spinning reserve," "regulating reserve," "non-spinning reserve," "supplemental reserve," and "contingency reserve" are conventional in the art and their uses and inter-relations are described in the Description of Related Art above. The term "environment" refers to general conditions, such as air temperature, humidity, barometric pressure, wind speed, rainfall quantity, water temperature, etc., at or proximate a service point or associated with a device (e.g., water temperature of water in a hot water heater or a swimming pool). The term "device," as used herein, means a power-consuming device, a power storage device, and/or a power generating device, as contemplated by the particular context of the use of such term. With respect to power consuming devices, there may generally be two different types of devices within a service point, namely, an environmentally-dependent device and an environmentally-independent device. An environmentally-dependent device is any power consuming device that turns on or off, or modifies its behavior, based on one or more sensors that detect characteristics, such as temperature, humidity, pressure, or various other characteristics, of an environment. An environmentally-dependent device may directly affect and/or be affected by the environment in which it operates. An environmentally-independent device is any power-consuming device that turns on or off, or modifies its behavior, without reliance upon inputs from any environmental sensors. Generally speaking, an environmentally-independent device does not directly affect, and is not typically affected by, the environment in which it operates, although, as one skilled in the art will readily recognize and appreciate, operation of an environmentally-independent device can indirectly affect, or occasionally be affected by, the environment. For example, as those skilled in the art readily understand, a refrigerator or other appliance generates heat during operation, thereby causing some heating of the ambient air proximate the device. Power consuming devices may include any resistive load consuming devices and/or any inductive devices (e.g., motors) that consume electricity. Some devices may have the ability to change their geodetic locations and/or change their functions. For example, electric or hybrid electric vehicles may move from service point to service point and function as power consuming devices (e.g., while consuming the electricity stored in their batteries) or power storage devices (e.g., during time periods when their batteries are fully or partially charged and the vehicle is not being used for transportation).

It will be appreciated that embodiments or components of the systems described herein may be comprised of one or more conventional processors and unique stored program instructions that control the one or more processors to implement, in conjunction with certain non-processor circuits, some, most, or all of the functions for determining an electric utility's available or dispatchable operating (e.g., regulating and spinning) reserve that is derived from projected power savings resulting from monitoring and management of loads in one or more active load management systems as described herein. The non-processor circuits may include, but are not limited to, radio receivers, radio transmitters, antennas, modems, signal drivers, clock circuits, power source circuits, relays, meters, memory, smart breakers, current sensors, and user input devices. As such, these functions may be interpreted as steps of a method to store and distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the foregoing approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Generally, the present invention encompasses a system and method for estimating operating reserve (e.g., spinning and/or regulating reserve) for a utility servicing one or more service points. In one embodiment, the utility employs an active load management system (ALMS) to remotely determine, during at least one period of time, power consumed by at least one device located at the one or more service points and receiving power from the utility to produce power consumption data. The power consumption data is regularly stored and updated in a repository. The ALMS or a control component thereof, such as an active load director (ALD), determines an expected, future time period for a control event during which power is to be interrupted or reduced to one or more devices. Prior to commencement of the control event, the ALMS or its control component: (i) estimates power consumption behavior expected of the device(s) during the time period of the control event based at least on the stored power consumption data, (ii) determines projected energy savings resulting from the control event based at least on the estimated power consumption behavior of device(s), and determines operating (e.g., regulating and/or spinning) reserve based on the projected energy savings. The determined operating reserve may be made available to the current power utility or to the power market through the existing (e.g., Federal Energy Regulatory Commission) power grid. In one embodiment, the ALD populates an internal repository (e.g., database, matrix, or other storage medium) with measurement data indicating how individual devices within individual service points consume power or otherwise behave under normal operation and during control events. The power consumption data is updated through regular (e.g., periodic or otherwise) sampling of device operating conditions (e.g., current draw, duty cycle, operating voltage, etc.). When an ALD is first installed in an ALMS for an electric utility power grid, there is little data with which to create regulating and spinning reserve forecasts. However, over time, more and more data samples are used to improve the quality of the data in the repository. This repository is used to project both energy usage and energy savings. These projections can be aggregated for an entire service point, a group of service points, or the entire utility.

In an alternative embodiment, additional data may be used to help differentiate each data sample stored in the repository. The additional data is associated with variability factors, such as, for example, outside air temperature, day of the week, time of day, humidity, sunlight, wind speed, altitude, orientation of windows or doors, barometric pressure, energy efficiency rating of the service point, insulation used at the service point, and others. All of these variability factors can have an influence on the power consumption of a device. Some of the variability factor data may be obtained from public sources, such as local, state or national weather services, calendars, and published specifications. Other variability factor data may be obtained privately from user input and from sensors, such as humidity, altitude, temperature (e.g., a thermostat), and optical or light sensors, installed at or near a service point (e.g., within or at a residence or business).

Figure 2:
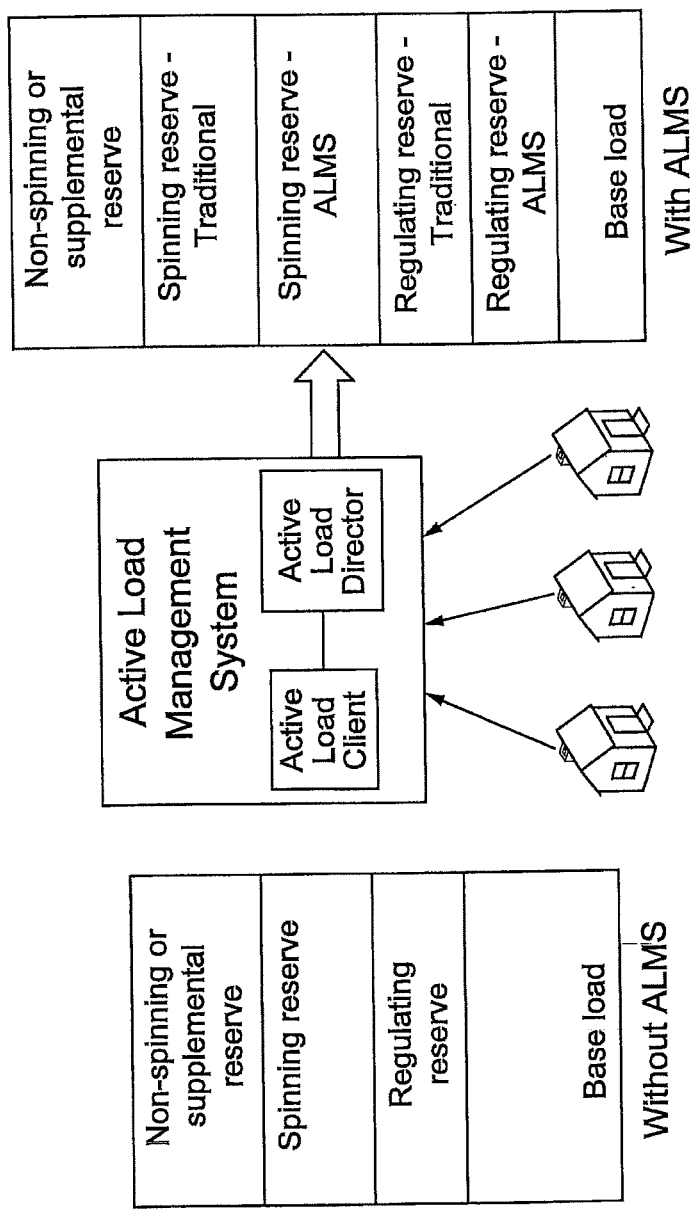
FIG. 2 is a block diagram illustrating how an active load management system in accordance with the present invention provides additional operating (e.g., regulating, spinning and/or non-spinning) reserve to a power utility.

FIG. 2 is a block diagram illustrating how an ALMS operating in accordance with the present invention provides additional operating (e.g., regulating, spinning, and/or non-spinning) reserve to a power utility. Without use of an ALMS operating in accordance with the present invention, the utility has capacity equal to its base load plus its regulating reserve, spinning reserve, and non-spinning reserve as shown on the left side of the figure. However, with use of an ALMS operating in accordance with the present invention, the utility has additional operating reserve, which may be preferably used as regulating, spinning and/or non-spinning reserve (as illustrated in FIG. 2), by drawing power selectively from service points through the interruption or reduction of power to devices, such as air conditioners, furnaces, hot water heaters, pool pumps, washers, dryers, boilers, and/or any other inductive or resistive loads, at the service points.

Figure 3:
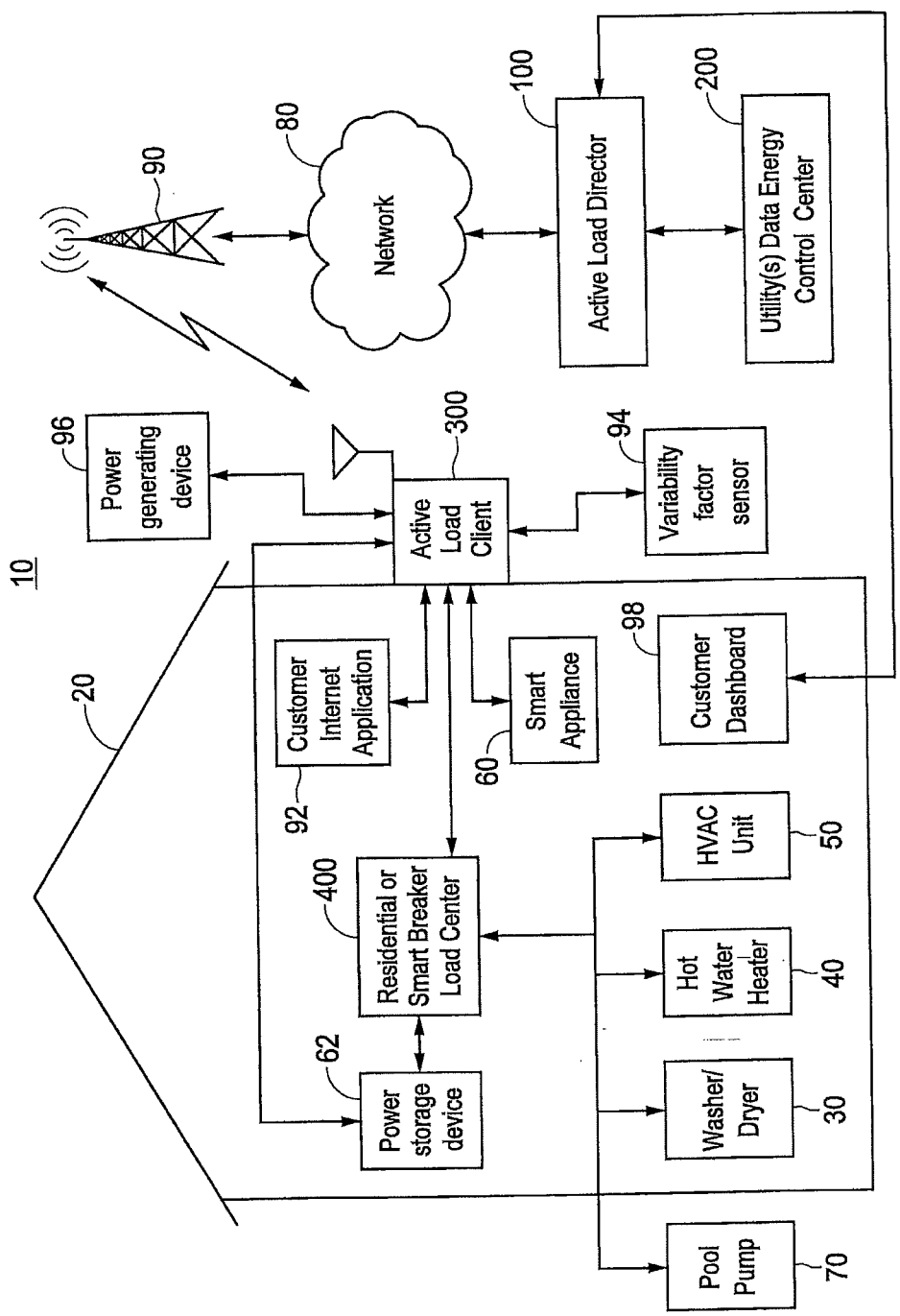
FIG. 3 is a block diagram of an exemplary IP-based, active load management system in accordance with one embodiment of the present invention.

The present invention can be more readily understood with reference to FIGS. 3-16, in which like reference numerals designate like items. FIG. 3 depicts an exemplary IP-based active load management system (ALMS) 10 that may be utilized by an electric utility, which may be a conventional power-generating utility or a virtual utility, in accordance with the present invention. The below description of the ALMS 10 is limited to specific disclosure relating to embodiments of the present invention. A more general and detailed description of the ALMS 10 is provided in commonly-owned U.S. application Ser. No. 11/895,909, which was published as U.S. Patent Application Publication No. US 2009/0062970 A1 on Mar. 5, 2009 and is incorporated herein by this reference as if fully set forth herein. U.S. Patent Application Publication No. US 2009/0062970 A1 provides details with respect to the exemplary operational implementation and execution of control events to interrupt or reduce power to devices located at service points, such as residences and businesses. The use of an ALMS 10 to implement a virtual utility is described in detail in commonly-owned and co-pending U.S. application Ser. No. 12/001,819, which was filed on Dec. 13, 2007, was published as U.S. Patent Application Publication No. US 2009/0063228 A1 on Mar. 5, 2009, and is incorporated herein by this reference as if fully set forth herein.

The ALMS 10 monitors and manages power distribution via an active load director (ALD) 100 connected between one or more utility control centers (UCCs) 200 (one shown) and one or more active load clients (ALCs) 300 (one shown) installed at one or more service points 20 (one exemplary residential service point shown). The ALD 100 may communicate with the utility control center 200 and each active load client 300 either directly or through a network 80 using the Internet Protocol (IP) or any other (IP or Ethernet) connection-based protocols. For example, the ALD 100 may communicate using RF systems operating via one or more base stations 90 (one shown) using one or more wireless communication protocols, such as GSM, ANSI C12.22, Enhanced Data GSM Environment (EDGE), HSPA, LTE, Time Division Multiple Access (TDMA), or CDMA data standards, including CDMA 2000, CDMA Revision A, CDMA Revision B, and CDMA EVDO Rev. A. Alternatively, or additionally, the ALD 100 may communicate via a digital subscriber line (DSL) capable connection, cable television based IP capable connection, or any combination thereof. In the exemplary embodiment shown in FIG. 3, the ALD 100 communicates with one or more active load clients 300 using a combination of traditional IP-based communication (e.g., over a trunked line) to a base station 90 and a wireless channel implementing the HSPA or EVDO protocol from the base station 90 to the active load client 300. The distance between the base station 90 and the service point 20 or the active load client 300 is typically referred to as the "last mile" even though the distance may not actually be a mile. The ALD 100 may be implemented in various ways, including, but not limited to, as an individual server, as a blade within a server, in a distributed computing environment, or in other combinations of hardware and software. In the following disclosure, the ALD 100 will be described as embodied in an individual server to facilitate an understanding of the present invention. Thus, the server embodiment of the ALD 100 described below corresponds generally to the description of the ALD 100 in US Patent Application Publication Nos. US 2009/0062970 A1 and US 2009/0063228 A1.

Each active load client 300 is preferably accessible through a specified address (e.g., IP address) and controls and monitors the state of individual smart breaker modules or intelligent appliances 60 installed at the service point 20 (e.g., in the business or residence) to which the active load client 300 is associated (e.g., connected or supporting). Each active load client 300 is preferably associated with a single residential or commercial customer. In one embodiment, the active load client 300 communicates with a residential load center 400 that contains smart breaker modules, which are able to switch from an "ON" (active) state to an "OFF" (inactive) state, and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance (e.g., a washer/dryer 30, a hot water heater 40, an HVAC unit 50, or a pool pump 70). In an alternative embodiment, IP addressable relays or device controllers that operate in a manner similar to a "smart breaker" may be used in place of smart breakers, but would be installed coincident with the load under control and would measure the startup power, steady state power, power quality, duty cycle and energy load profile of the individual appliance 60, HVAC unit 40, pool pump 70, hot water heater 40, or any other controllable load as determined by the utility or end customer.

Additionally, the active load client 300 may control individual smart appliances directly (e.g., without communicating with the residential load center 400) via one or more of a variety of known communication protocols (e.g., IP, Broadband over Powerline (BPL) in its various forms, including through specifications promulgated or being developed by the HOMEPLUG Powerline Alliance and the Institute of Electrical and Electronic Engineers (IEEE), Ethernet, Bluetooth, ZigBee, Wi-Fi (IEEE 802.11 protocols), HSPA, EVDO, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, the smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

The active load client 300 may further be coupled to one or more variability factor sensors 94. Such sensors 94 may be used to monitor a variety of variability factors affecting operation of the devices, such as inside and/or outside temperature, inside and/or outside humidity, time of day, pollen count, amount of rainfall, wind speed, and other factors or parameters.

Figure 4:
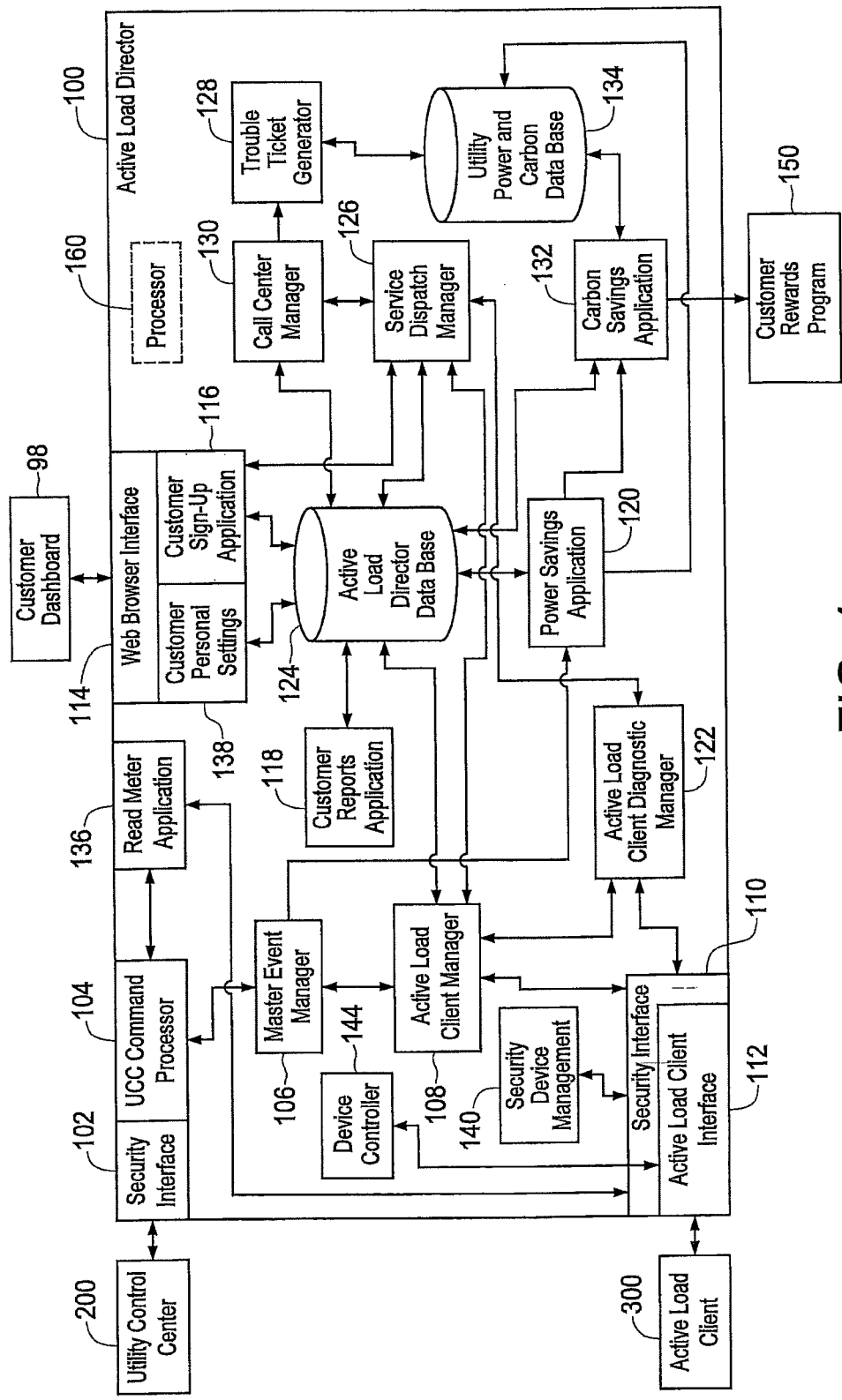
FIG. 4 is a block diagram illustrating an exemplary active load director as shown in the power load management system of FIG. 3.

Referring now to FIG. 4, the ALD 100 may serve as the primary interface to customers, as well as to service personnel, and operates as the system controller sending control messages to, and collecting data from, installed active load clients 300 as described in detail below and in U.S. Patent Application Publication No. US 2009/0062970 A1. In the exemplary embodiment depicted in FIG. 4, the ALD 100 is implemented as an individual server and includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon (P&C) database 134, a read meter application 136, a security device manager 140, a device controller 144, and one or more processors 160 (one shown). The operational details of several of the elements of the ALD 100 are described below with respect to their use in connection with the present invention. The operational details of the remaining elements of the ALD 100 may be found in U.S. Patent Application Publication Nos. US 2009/0062970 A1 and US 2009/0063228 A1, wherein the ALD 100 is also described in the context of an individual server embodiment.

In one embodiment, a sampling repository is used to facilitate the determination of dispatchable operating reserve power or energy (e.g., spinning and/or regulating reserve) for a utility. An exemplary sampling repository 500 is shown in block diagram form in FIG. 5. As illustrated in FIG. 5, the sampling repository 500 is a means for storing device monitoring data and other data that collectively details how devices (e.g., a hot water heater 40 as shown in FIG. 5) have behaved under specific conditions. The repository 500 may be in various forms, including a matrix, a database, etc. In one embodiment, the sampling repository 500 is implemented in the ALD database 124 of the ALD 100. Alternatively, the sampling repository 500 may reside elsewhere within the ALD 100 or be external to the ALD 100. The sampling repository 500 contains all power consumption data for devices located at a service point 20 or within a utility. Power consumption data may include, but is not limited to: current reading, energy/power used or consumed, energy/power saved, drift or drift rate, power time, user settings for maximum environmental variances, and/or time periods (e.g., hours of the day, days of the week, and calendar days). Taken collectively, this data is used to show how devices behaved during normal operation as well as during control events in which power is temporarily interrupted or reduced to one or more devices. The data may be obtained via passive sampling (e.g., regular monitoring of devices at a particular service point 20 by the active load client 300 associated with the service point 20) and/or active sampling (e.g., direct polling of the devices for the data by the active load client 300 or the ALD 100). As discussed below, the sampling repository 500 is used by the ALD 100 or other components of the ALMS 10 to estimate or project power consumption behavior of the devices and to determine projected power/energy savings resulting from a control event. The projected power savings may be determined using the power savings application 120 based upon the power consumption data in the repository 500.

FIG. 6 is an exemplary screen shot displayed to a user (e.g., customer) during execution of a customer personal settings application 138. The illustrated screen shot shows a screen being used to set the customer preferences for an environmentally-dependent device, such as an HVAC unit 50, a humidifier, or a pool heater. The illustrated screen shot may be provided to the customer, in one embodiment, via an Internet-accessible web portal 98 (referred to herein as the "customer dashboard"), when such portal is accessed by the customer via a computer, smart phone, or other comparable device. As shown in FIG. 3, the customer dashboard 98 may be connected to the ALD 100 via an Internet service provider for the service point 20 or may be implemented as a customer Internet application 92 when Internet service is supplied through the active load client 300 as described in U.S. Patent Application Publication No. US 2009/0063228 A1. The customer dashboard 98 effectively provides the customer with access into the ALD 100. The ALD's web browser interface 114 accepts inputs from the customer dashboard 98 and outputs information to the customer dashboard 98 for display to the customer. The customer dashboard 98 may be accessed from the service point 20 or remotely from any Internet-accessible device, preferably through use of a user name and password. Thus, the customer dashboard 98 is preferably a secure, web-based interface used by customers to specify preferences associated with devices controlled by the ALD 100 and located at the customer's service point 20, as well as to provide information requested by the customer personal settings application 138 or the customer sign-up application 116 in connection with controlled devices and/or service point conditions or parameters. Customer preferences may include, for example, control event preferences (e.g., times, durations, etc.), bill management preferences (e.g., goal or target for maximum monthly billing cost), maximum and minimum boundary settings for environmental characteristics, and others.

FIG. 7 is another exemplary screen shot displayed to a customer via the customer dashboard 98 during execution of a different portion of the customer personal settings application 138. FIG. 7 shows how customer preferences could be set for an environmentally-independent device, such as a hot water heater 40, a pool pump 70, or a sprinkler system water pump (which may also be an environmentally-dependent device if it includes, for example, a rainfall sensor). Using the web browser interface 114, customers interact with the ALD 100 and specify customer personal settings 138 that are recorded by the ALD 100 and stored in the ALD database 124 or other repository 500. The personal settings 138 may specify time periods during which load control events are permitted, time periods during which load control events are prohibited, maximum allowable variances for an operating environment at a particular service point 20 (e.g., maximum and minimum temperature and/or humidity), normal operating conditions of devices at different times of day, and other personal preferences related to operation of devices under the control of the ALD 100 through the active load client 300 at the service point 20.

As alluded to above, the present invention optionally tracks and takes into account the "drift" of an environmentally-dependent device. Drift occurs when the environmental characteristic(s) (e.g., temperature) monitored by an environmentally-dependent device begins to deviate (e.g., heat up or cool down) from a set point that is to be maintained by the environmentally-dependent device. Such deviation or drift may occur both normally and during control events. Thus, drift is the time it takes for the monitored environmental characteristic to move from a set point to an upper or lower comfort boundary when power, or at least substantial power, is not being consumed by the device. In other words, drift is a rate of change of the monitored environmental characteristic from a set point without use of significant power (e.g., without powering an HVAC unit compressor, but while continuing to power an associated digital thermostat and HVAC unit control system). One of ordinary skill in the art will readily appreciate that devices, such as HVAC units 50, which control one or more environmental characteristics at a service point 20, are also influenced or affected by the environment at the service point 20 because their activation or deactivation is based on one or more sensed environmental characteristics at the service point 20. For example, an HVAC unit 50 in cooling mode that attempts to maintain an inside temperature of 77° F. activates when the inside temperature is some temperature greater than 77° F. and, therefore, is influenced or affected by the environment in which the HVAC unit 50 operates.

The inverse of drift is "power time," which is the time it takes for the sensed environmental characteristic to move from a comfort boundary to a set point when significant or substantial power is being supplied to the environmentally-dependent device. In other words, "power time" is a rate of change of the monitored environmental characteristic from a comfort boundary to a set point with significant use of power. Alternatively, "drift" may be considered the time required for the monitored environmental characteristic to move to an unacceptable level after power is generally turned off to an environmentally-dependent device. By contrast, "power time" is the time required for the monitored environmental characteristic to move from an unacceptable level to a target level after power has been generally supplied or re-supplied to the environmentally-dependent device.

The power consumption data for an environmentally-dependent device, which may be gathered actively or passively as described above, may be used to empirically determine the drift and power time (rate of change, temperature slope, or other dynamic equation (f{x})) that defines an environmental characteristic's variation at a service point 20, or at least within the operating area of the environmentally-dependent device, so as to permit the determination of a uniquely derived "fingerprint" or power usage/consumption pattern or behavior for the service point 20 or the environmentally-dependent device.

Customers define the upper and lower boundaries of comfort by inputting customer preferences 138 through the web browser interface 114, with the set point optionally being in the middle of those boundaries. During normal operation, an environmentally-dependent device will attempt to keep the applicable environmental characteristic or characteristics near the device's set point or set points. However, all devices, whether environmentally-dependent or environmentally-independent, have a duty cycle that specifies when the device is in operation because many devices are not continuously in operation. For an environmentally-dependent device, the duty cycle ends when the environmental characteristic(s) being controlled reaches the set point (or within a given tolerance or variance of the set point). After the set point has been reached, the environmentally-dependent device is generally turned off and the environmental characteristic is allowed to "drift" (e.g., upward or downward) toward a comfort boundary. Once the environmental characteristic (e.g., temperature) reaches the boundary, the environmentally-dependent device is generally activated or powered on again until the environmental characteristic reaches the set point, which ends the duty cycle and the power time.

Drift may also occur during a control event. A control event is an action that temporarily reduces, terminates, or otherwise interrupts the supply of power to a device. During a control event, the environmental characteristic (e.g., temperature) monitored and/or controlled by an environmentally-dependent device will drift toward a comfort boundary (e.g., upper or lower) until the environmental characteristic reaches that boundary. Once the environmental characteristic reaches the boundary, the ALMS 10 generally returns or increases power to the device to enable the environmental characteristic to reach the set point again.

For example, an HVAC unit 50 may have a set point of 72° F. and minimum and maximum comfort boundary temperatures of 68° F. and 76° F., respectively. On a cold day, a control event may interrupt power to the HVAC unit 50 causing the monitored temperature within the service point 20 to move toward the minimum comfort boundary temperature. Once the monitored temperature inside the service point 20 reaches the minimum comfort boundary temperature, the control event would end, and power would be restored or increased to the HVAC unit 50, thus causing the monitored temperature to rise toward the set point. A similar, but opposite effect, may take place on a warm day. In this example, "drift" is the rate of change with respect to the time it takes the HVAC unit 50 to move from the set point to either the upper or lower comfort bounds. Analogously, "power time" is the rate of change with respect to the time required for the HVAC unit 50 to move the monitored temperature from the upper or lower comfort bounds to the set point. In one embodiment of the present invention, drift and power time are calculated and recorded for each environmentally-dependent or environmentally-independent device or for each service point 20.

In another embodiment, drift and other measurement data available from the ALD database 124 are used to create a power consumption behavior or pattern for each environmentally-dependent or environmentally-independent device or for each service point 20. The other measurement data may include vacancy times, sleep times, times in which control events are permitted, and/or other variability factors.

The environment within an energy-efficient structure will have a tendency to exhibit a lower rate of drift. Therefore, environmentally-dependent devices operating within such structures may be subject to control events for longer periods of time because the amount of time taken for the monitored environmental characteristic to reach a comfort boundary due to drift after being set to a set point is longer than for less efficient structures.

In another embodiment, the ALD 100 may identify service points 20 that have an optimum drift for power savings. The power savings application 120 calculates drift for each service point 20 and/or for each environmentally-dependent device at the service point 20, and saves the drift information in the ALD database 124 as part of power consumption data for the device and/or the service point 20. Thus, power saved as a result of drift during a control event increases overall power saved by the environmentally-dependent device at the service point 20.

Figure 8:
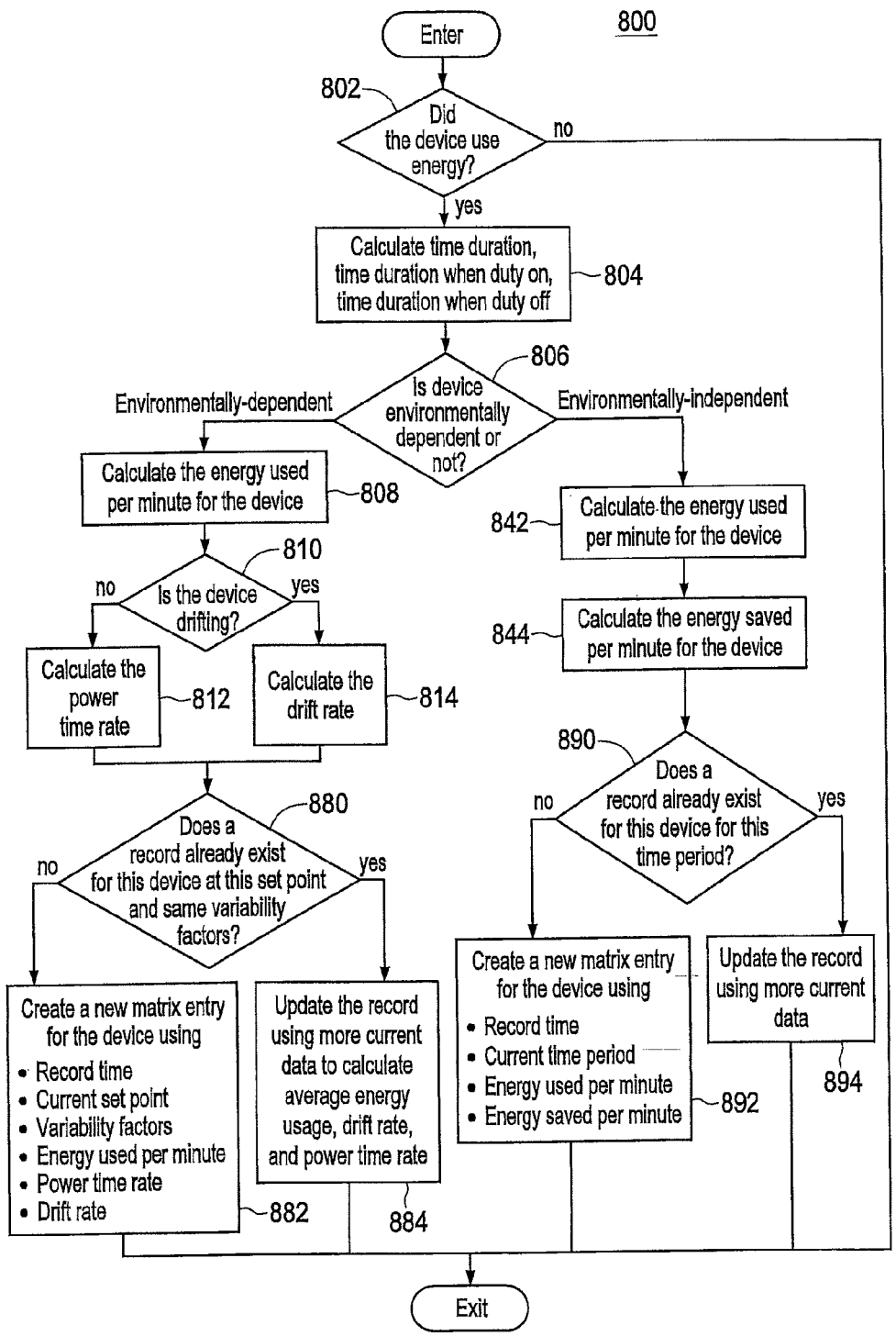
FIG. 8 is an operational flow diagram illustrating a method for empirically analyzing power usage of power consuming devices and populating a repository with data samples resulting from such power usage analysis, in accordance with an exemplary embodiment of the present invention.

FIG. 8 illustrates an exemplary operational flow diagram 800 providing steps executed by the ALD 100 to empirically analyze power usage of devices and populate a repository 500 with data samples resulting from such power usage analysis, in accordance with one embodiment of the present invention. The steps in FIG. 8 may be considered to implement a passive sampling algorithm. The steps of FIG. 8 are preferably implemented as a set of computer instructions (software) stored in memory (not shown) of the ALD 100 and executed by one or more processors 160 of the ALD 100.

According to the logic flow, the active load client 300 polls devices within the service point 20, such as a washer/dryer 30, hot water heater 40, HVAC unit 50, smart appliance 60, pool pump 70, or other devices within the service point 20, and obtains current readings. Upon receiving the current reading data from the active load client 300, the ALC interface 112 sends the data to the ALC manager 108. The ALC manager 108 stores the data to the sampling repository 500, which may be implemented in the ALD database 124 using the operational flow illustrated in FIG. 8.

The following information may be provided as parameters to the operational flow of FIG. 8: an identification (ID) of the device, temperature mode (either "heating" or "cooling"), duty cycle, current temperature read by the device, and previous temperature reading. Each temperature reading includes a device ID, a set point (which is only useful for environmentally-dependent devices), and variability factor measurement data (as described previously).

Initially, the ALD 100 determines (802) whether the device used any, or at least any appreciable amount of, energy. If not, then the logic flow ends. Otherwise, the ALD 100 determines (804) the time duration of the data sample, the time duration when the device was on, and the time duration when the device was off based on the data sample. Next, the ALD 100 determines (806) whether the received data comes from an environmentally-dependent device or an environmentally-independent (e.g., binary state) device. If the received data comes from an environmentally-dependent device, then the ALD 100 determines (808) the energy used per minute for the device, and determines (810) whether the device is drifting or powering. The ALD 100 determines that the device is drifting if the environmental characteristic monitored by the device is changing in a manner opposite the mode of the device (e.g., the room temperature is rising when the device is set in cooling mode or the room temperature is decreasing when the device is set in heating mode). Otherwise, the device is not drifting.

If the device is drifting, then the ALD 100 determines (814) the drift rate (e.g., degrees per minute). On the other hand, if the device is not drifting, then the ALD 100 determines (812) the power time rate. Once either the drift rate or the power time rate has been calculated, the ALD 100 determines (880) whether there is already a record in the sampling repository 500 for the device being measured under the present operating conditions of the device (e.g., set point and other variability factors (e.g., outside temperature)). If there is no existing record, then the ALD 100 creates (882) a new record using, for example, the device's ID, time of record, current set point, current outside temperature, energy used per minute, power time rate, and drift rate (assuming that either a power time rate or a drift rate has been determined). However, if there is an existing record, then the ALD 100 updates (884) the existing record by averaging the new data (including energy usage, drift rate, and power time rate) with the existing data and storing the result in the repository 500.

If the ALD 100 determines (806) that the received data comes from an environmentally-independent device, then the ALD 100 determines (842) the energy used per minute for the device and further determines (844) the energy saved per minute for the device. The ALD 100 then searches the repository 500 (e.g., ALD database (124)) to determine (890) whether there is already a record for the device for the applicable time period. If there is no existing record, then the ALD 100 creates (892) a new record using the device's ID, time of record, current time block, energy used per minute, and energy saved per minute. However, if there is an existing record, then the ALD 100 updates (894) the existing record by averaging the new data (including energy usage and energy savings) for the time block with the existing data for the time block and stores the result in the repository 500. For environmentally-independent devices, energy usage and energy savings are saved with respect to a block or period of time.

Figure 9:
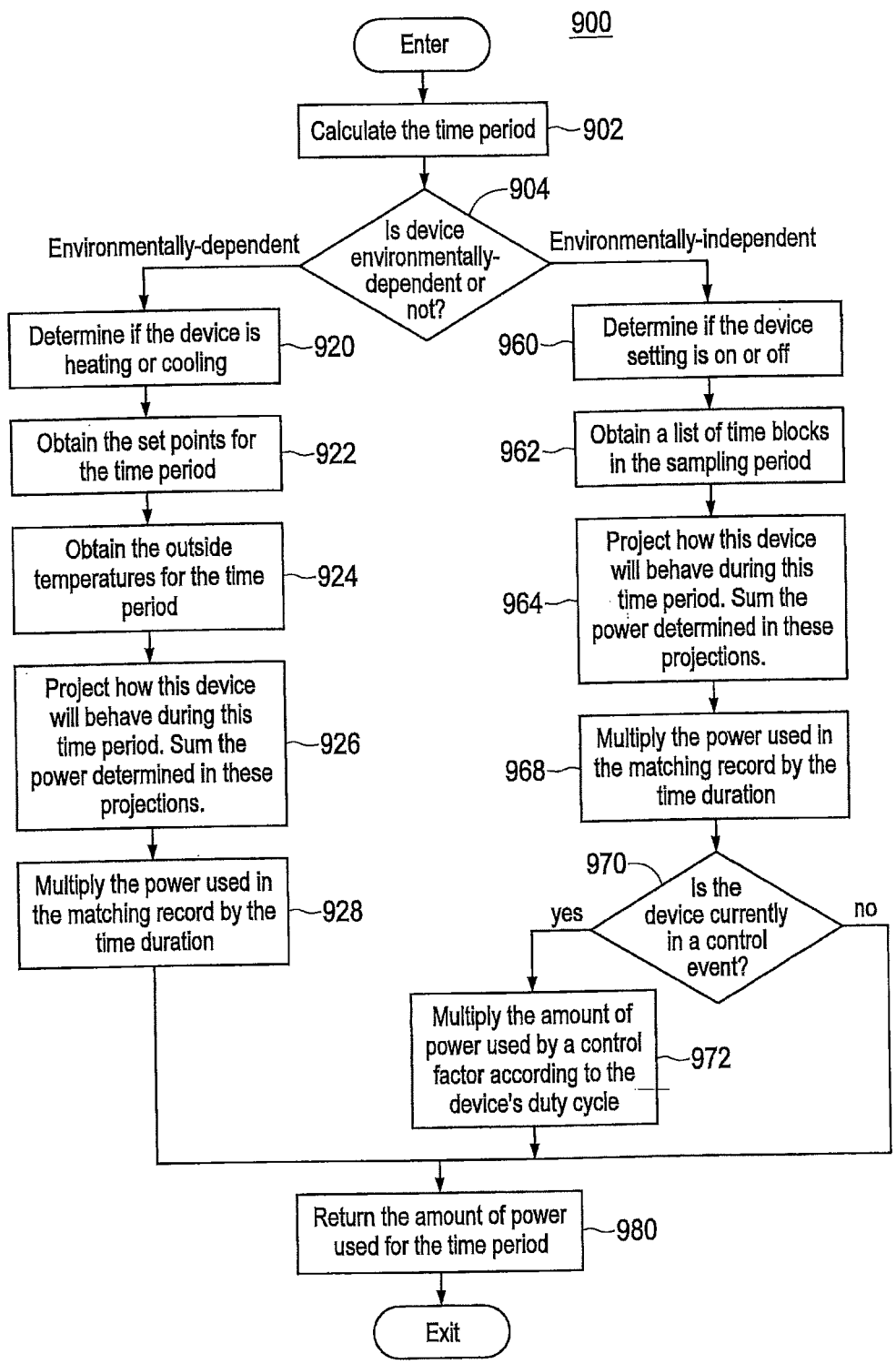
FIG. 9 is an operational flow diagram illustrating a method for projecting energy usage for a power consuming device in accordance with an exemplary embodiment of the present invention.

FIG. 9 illustrates an exemplary operational flow diagram 900 providing steps executed by the ALD 100 to project or estimate the energy usage expected of a device during a future time period in a given environment setting, in accordance with one embodiment of the present invention. The steps of FIG. 9 are preferably implemented as a set of computer instructions (software) stored in memory (not shown) of the ALD 100 and executed by one or more processors 160 of the ALD 100. In accordance with one embodiment, the operational flow of FIG. 9 may be executed by the power savings application 120 of the ALD 100 when a utility operator, or other operator of the ALD 100, wants to project the energy usage for a device over a specified time period in the future, such as during a period of time in which a control event is to occur.

The following information may be provided as parameters to the operational flow of FIG. 9: the device ID, the start time of the future time period, the end time of the future time period, the manage mode of the device, and, for an environmentally-independent device, a binary control factor. The manage mode is either "control" or "normal" to indicate whether the device is being measured during a control event or during normal operation, respectively. The binary control factor is preferably utilized for environmentally-independent devices and represents the duty cycle of the device. For example, if a water heater 40 runs at 20% duty cycle, the binary control factor is 0.2.

Initially, the ALD 100 (e.g., power savings application 120) determines (902) a future time period based on the start and stop times. The future time period may be set by the utility implementing the load control procedure of the present invention or a second utility that has requested delivery of operating reserve power from the utility implementing the load control procedure of the present invention. After the time period at issue is known, the power savings application 120 begins the procedure for projecting or estimating the amount of power that can be saved as the result of execution of a control event during the future time period. Accordingly, the power savings application 120 analyzes the devices to be controlled during the control event. Thus, the power savings application 120 determines (904) whether the devices include both environmentally-dependent and environmentally-independent (e.g., binary state) devices. For each environmentally-dependent device, the power savings application 120 determines (920) whether the device is in environment controlling (e.g., heating or cooling) mode. Next, the power savings application 120 retrieves (922) the anticipated set points for the device during the future time period of the control event and obtains (924) information regarding the outside environmental characteristic(s) (e.g., the outside temperatures) expected during the control event time period. The power savings application 120 then makes projections (926) about the device's expected power consumption behavior during the future time period. In one embodiment, the projection determination of block 926 is implemented using a best match algorithm, as described in detail below with respect to FIG. 10, to find stored repository records that best match the behavior of the device for each combination of set points, outside environmental characteristics (e.g., temperatures), and time periods, as measured and stored using the logic flow of FIG. 8. The power consumption behavior of the device is used to determine the amount of energy that would be expected to be used by the device if the control event did not occur and, thus, the amount of energy estimated or expected to be saved per unit time during the control event. The power savings application 120 multiplies (928) the saved power per unit time by the time duration of the future control event to determine the total amount of energy projected to be used by the device in the absence of the control event. The power savings application returns (980) the total projected amount of energy used by the device in the absence of the proposed control event.

However, if the power savings application 120 determines (904) that the proposed control event is to affect an environmentally-independent device, then the power savings application 120 determines (960) whether the device is currently scheduled to be on or off during the proposed time period of the control event. Next, the power savings application 120 creates, obtains, or otherwise determines (962) a list of time blocks for the specified control event time period. The power savings application 120 then makes projections (964) about the device's power consumption behavior during the future, control event time period. In one embodiment, the projection determination of block 964 is implemented using a best match algorithm, as described in detail below with respect to FIG. 10, to find stored repository records that best match the behavior of the device for each combination of set points, outside environmental characteristics (e.g., temperatures), and time periods, as measured and stored using the logic flow of FIG. 8. The power consumption behavior of the device is used to determine the amount of energy that would be expected to be used by the device if the control event did not occur and, thus, the amount of energy estimated or expected to be saved per unit time during the control event. Next, the power savings application 120 multiplies (968) the saved power per unit time by the time duration of the future control event to determine the total amount of energy projected to be used in the absence of the control event. If the projected energy savings is based on power consumption during a previous control event (970), then the power savings application 120 multiplies (972) the total amount of energy times the binary control factor to determine the amount of energy projected to be used by the device in the absence of the control event. The power savings application returns (980) the total projected amount of energy used by the device in the absence of the proposed control event.

One or ordinary skill in the art will readily recognize and appreciate that the operational flow of FIG. 9 may be used for each controlled device at a service point, for the controlled devices at multiple service points, or for all the controlled devices at all the service points supplied or supported by a utility. The total projected energy usage by the devices may be aggregated across a single service point, for all service points within a group, and/or for all groups served by the utility.

Figure 10:
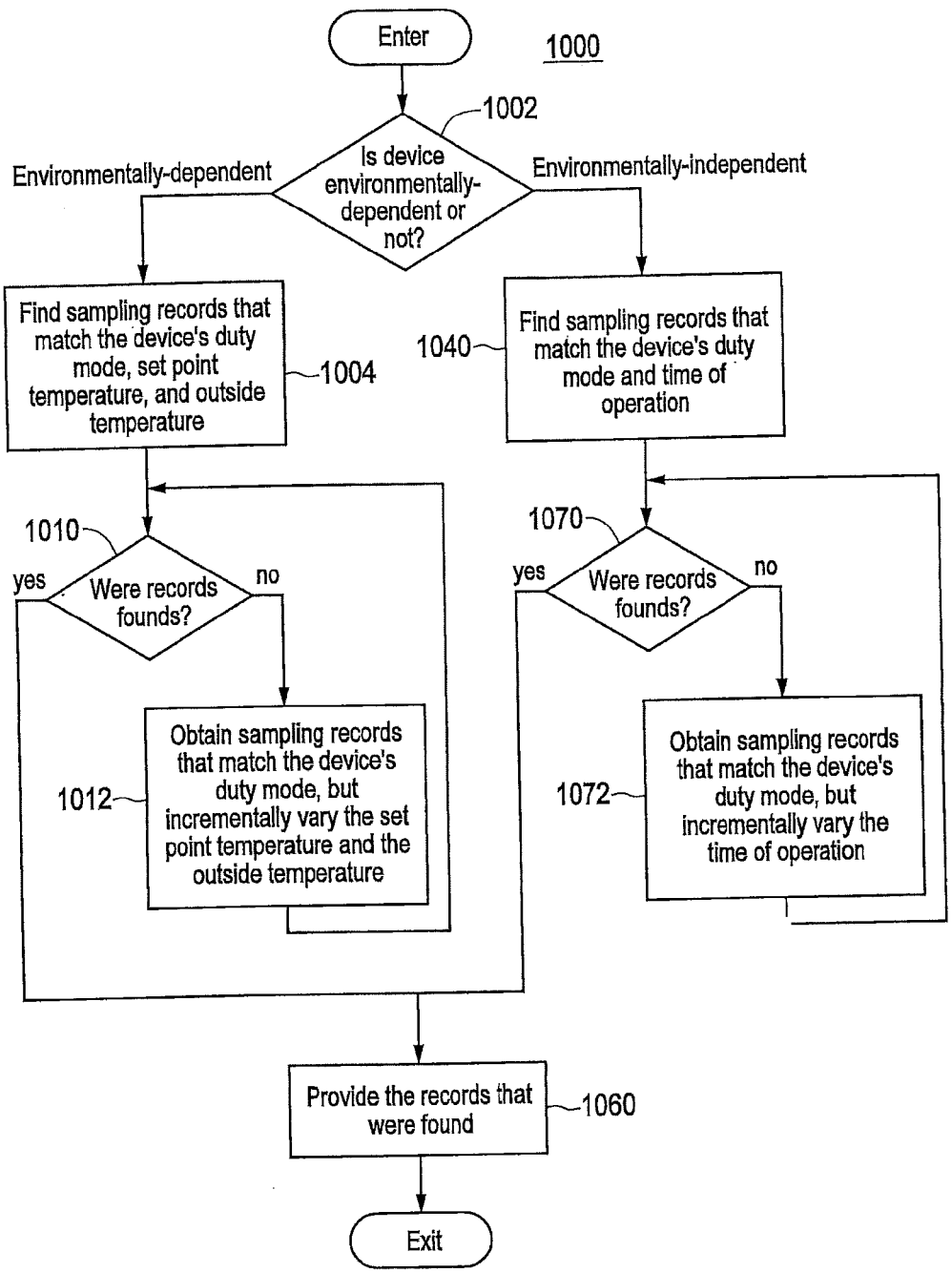
FIG. 10 is an operational flow diagram illustrating a method for estimating power consumption behavior of a power consuming device in accordance with an exemplary embodiment of the present invention.

FIG. 10 illustrates an exemplary operational flow diagram 1000 providing steps executed by the ALD 100 for estimating power consumption behavior of a device in accordance with an exemplary embodiment of the present invention. The algorithm or operational flow illustrated in FIG. 10 provides one embodiment for implementing steps 926 and 964 of FIG. 9. The operational flow of FIG. 10 determines which record or records in the sampling repository 500 provides the closest match to a given environment or operational setting for use in projecting device energy usage/savings during a time period of a future control event, in accordance with one embodiment of the present invention. The steps of FIG. 10 are preferably implemented as a set of computer instructions (software) stored in memory (not shown) of the ALD 100 and executed by one or more processors 160 of the ALD 100. The operational flow of FIG. 10 may be initiated by the ALD 100 when trying to identify or determine the sampling repository record or records that best match the power consumption behavior of a device in a specific setting.

In one embodiment, the operational flow of FIG. 10 is called during execution of the operational flow of FIG. 9 as noted above. When so called, the operational flow of FIG. 9 provides the operational flow of FIG. 10 with parameters that indicate the type of records to be searched. These parameters include, but are not limited to: a device ID, a duty mode (either on or off), a time period (e.g., corresponding to the time period of the proposed future control event), a set point delta, a delta or variance related to one or more environmental characteristics (e.g., outside temperature), and a time block delta. Duty mode signifies the duty cycle of the device. If the duty mode is TRUE or ON, significant power is being consumed. If the duty mode is FALSE or OFF, significant power is not being consumed (i.e., power is being saved). Duty cycle exists for switch-controlled, binary state, or environmentally-independent devices which go ON and OFF irrespective of the influence or affect of environment. For HVAC devices 50, duty mode is always ON. Set point delta is the amount a set point may be varied during a search in order to find a matching repository record. Outside temperature/environmental characteristic delta is the number of temperature degrees or other change in environmental characteristics over which data relating to the outside temperature or other environmental characteristics may be varied during a search in order to find a matching repository record. Time block delta is the amount of time a time block may be varied during a search in order to find a matching repository record.

Initially, the ALD 100 determines (1002) whether the requested repository search relates to an environmentally-dependent device or an environmentally-independent device. If the search relates to an environmentally-dependent device, then the ALD 100 attempts to find (1004) power consumption records in the sampling repository 500 that match the device ID, duty mode, environmental characteristic (e.g., temperature) set point, and associated outside environmental characteristic data. Power consumption records include power consumption data, such as power consumed, current drawn, duty cycle, operating voltage, operating impedance, time period of use, set points, ambient and outside temperatures during use (as applicable), and/or various other energy use data. If a record exists that matches all the power consumption search criteria, such record would be considered the record that most closely matches the given environment setting. If no exact match is found (1010), then the ALD 100 begins looking for records that slightly differ from the given environment setting. In one embodiment, the ALD 100 incrementally increases or decreases (1012) the environment-related search criteria (e.g., temperature set point and/or outside/ambient temperature) using the set point delta and the outside temperature/environmental characteristic delta as a guide to look for relevant records. Such incremental/iterative modification of the search criteria continues until either relevant records are found or some applicable limit (e.g., as indicated by the set point delta and/or other parameter deltas) is reached.

If the ALD 100 determines (1002) that the search relates to an environmentally-independent device, then the ALD 100 attempts to find (1040) power consumption records in the sampling repository 500 that match the device ID, duty mode, and time of operation (corresponding to the expected, future time of the control event). If a record is not found that matches all the search criteria (1070), then the ALD 100 modifies its search to look for records that slightly differ from the given environment setting. In one embodiment, the ALD 100 modifies its search by incrementally increasing or decreasing (1072) the time of operation for a given duty mode. The iterative searching continues until either relevant records are found or some applicable limit (e.g., as indicated by the time block delta or other parameter deltas) is reached. Any records that were found as a result of the search are provided (1060) to the requesting program (e.g., the operational flow of FIG. 9). The result of the operational flow of FIG. 10 is a set of one or more power consumption records from the sampling repository 500 that are the closest match to the given environment or proposed control event setting.

Figure 11:
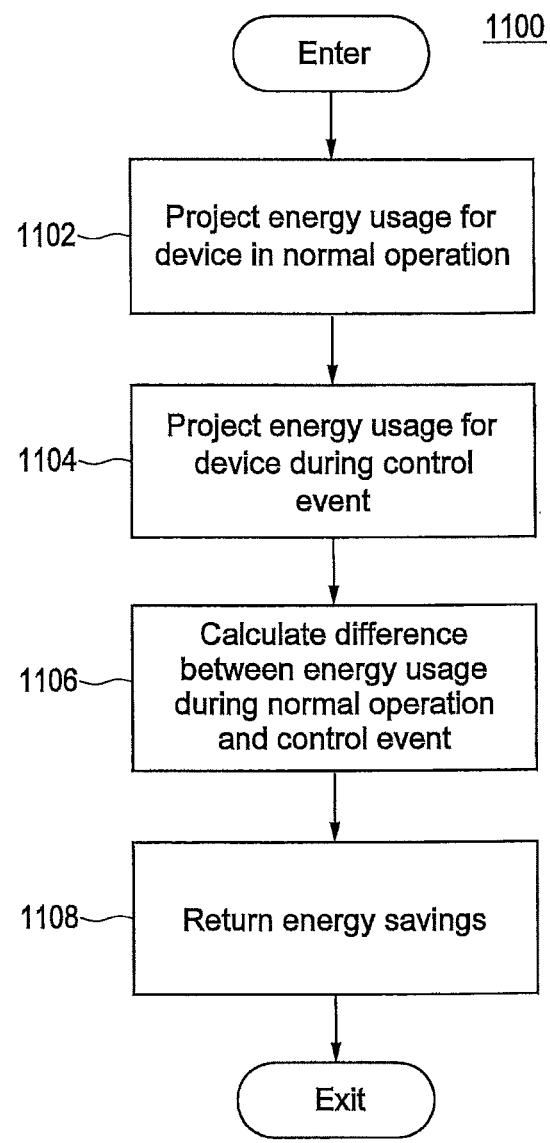
FIG. 11 is an operational flow diagram illustrating a method for projecting energy savings through power interruption to a power consuming device during a control event, in accordance with an exemplary embodiment of the present invention.

FIG. 11 illustrates an exemplary operational flow diagram 1100 providing steps executed by the ALD 100 to project energy savings through power interruption or reduction to a device during a control event, in accordance with one embodiment of the present invention. The steps of FIG. 11 are preferably implemented as a set of computer instructions (software) stored in memory (not shown) of the ALD 100 and executed by one or more processors 160 of the ALD 100. As with the operational flow of FIG. 9, the operational flow of FIG. 11 may be executed by the power savings application 120 when an operator of the utility or of the ALD 100 wants to project the energy savings for a device over a specified time period during operation of a control event.

The following information may be provided as parameters to the operational flow of FIG. 11: a device ID, a start time of the control event, an end time of the control event, and a binary control factor, as described above in connection with FIG. 9. Initially, the ALD 100 (e.g., power savings application 120) projects (1102) the energy usage/power consumption for the device during normal operation within the expected time period of the control event using, for example, the operational flow of FIG. 9. Next, the power savings application 120 projects (1104) the power consumption for the device during the control event using, for example, the operational flow of FIG. 9. For example, depending on the duty cycle, set points, drift or drift rate, power time, and other parameters for the device, the device may be projected to be on and consuming power for some amount of time during the time period of the control event. Thus, both the expected amount of power consumed during normal operation (i.e., in the absence of any control event) and the expected amount of power consumed during the control event are determined to accurately assess any possible power savings as a result of the control event. After the two projected power consumption values have been determined, the power savings application 120 calculates (1106) the difference between the two values, which is the projected power consumption for the device during the control event time period. Because the projected power consumption will not be realized during the control event, such power consumption corresponds directly to an amount of energy saved during the control event. The power savings application 120 returns (1108) the projected energy savings value. One of ordinary skill in the art will readily recognize and appreciate that the power savings application 120 may aggregate the projected power savings for all controlled devices at a service point 20, for all controlled devices at service points within a group, or for controlled devices within all service point groups served by the utility to obtain an aggregate amount of power savings as a result of a control event.

Another context in which the ALMS 10 may be utilized is in conjunction with other renewable energy sources. A number of renewable energy sources, such as wind power and solar power, are variable in nature. That is, such energy sources do not generate power at a constant rate. For example, wind increases or decreases from moment to moment. Wind turbines can generate a large amount of power due to large winds or can stop generating completely due to lack of any wind. Solar panels may be able to generate a great deal of power on very sunny days, a little power on cloudy days, and virtually no power at night.

As a result, power utilities that make use of renewable energy must compensate for the under-generation or over-generation of power from those sources. When renewable energy sources are under-generating, the ALMS 10 may utilize the processes disclosed above to provide additional operating reserve to compensate for the lack of power generation by the renewable energy source and for the effects resulting therefrom, including output frequency instability. For example, a utility utilizing wind or solar energy sources may further incorporate the ALMS 10 into the utility distribution system to provide regulating reserve during time periods of under-generation.

Figure 12:
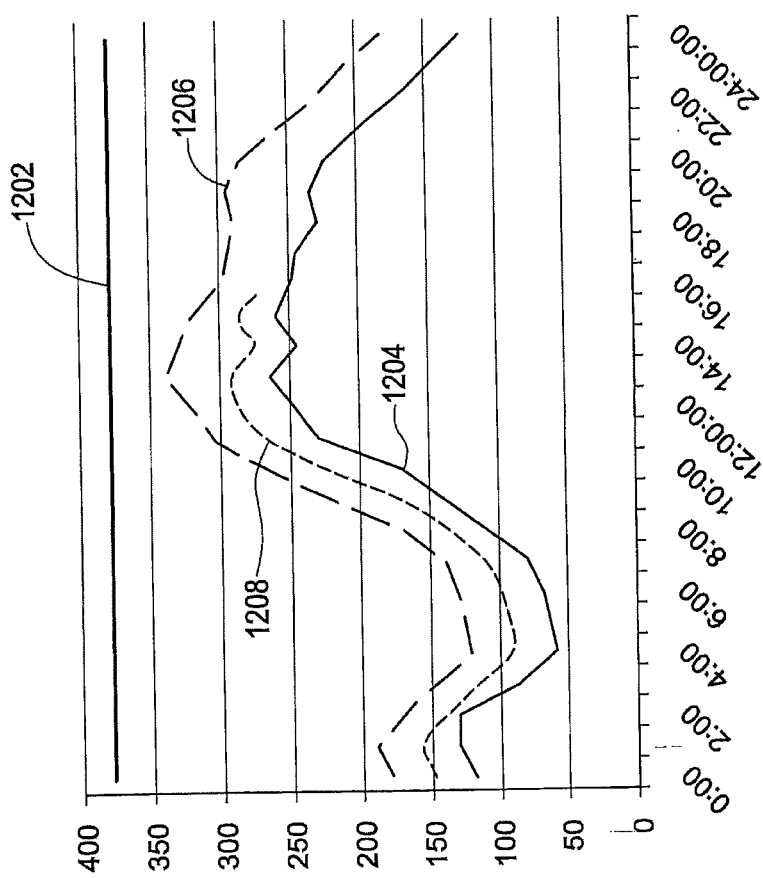
FIG. 12 is a graph that depicts a load profile of a utility during a projected time period, showing actual energy usage as well as projected energy usage determined with and without a control event, in accordance with an exemplary embodiment of the present invention.

FIG. 12 is a graph that depicts the "load profile" of a utility over a predetermined time period, showing actual energy usage as well as projected energy usage determined with and without a control event in accordance with an exemplary embodiment of the present invention. The load profile graph depicts the following:

a. Baseline power consumption 1202. This is the total possible load of, or power consumed by, all controlled devices over a specified period of time.

b. Projected interruptible load usage 1204 (i.e., projected load or energy usage with a control event) for all controlled devices at all service points (or at selected service points) served by the utility in the absence of a control event. The projected interruptible load usage may be determined in one embodiment through execution of the operational flow of FIG. 9. The projected interruptible load available 1204 indicates the load for all controlled devices if they are controlled 100% of the time using customer preferences. The projected interruptible load usage 1204 may be determined in one embodiment through execution of the operational flow of FIG. 11.

c. Projected interruptible load available 1206 (i.e., projected energy used when no control events are used) for all controlled devices at all service points (or at selected service points) served by the utility during a control event. The projected interruptible load available 1206 indicates the load for all controlled devices if they are controlled 100% of the time using customer preferences.

d. Actual interruptible load usage 1208 for all controlled devices at all service points (or at selected service points) served by the utility. The actual interruptible load usage 1208 is the power that is currently being used by all controlled devices.

This type of load profile graph may be generated for all controlled devices at a service point 20, for controlled devices at all service points within a group, or for controlled devices at all groups served by the utility.

In the load profile graph of FIG. 12, the capacity under contract is shown as a straight line at the top of the graph and indicates the baseline power consumption 1202. The baseline power consumption 1202 represents the total amount of power that the utility is obligated to provide. The actual interruptible load usage 1208 is the actual energy usage of all devices controlled by the utility. The projected interruptible load usage 1204 at the bottom of the load profile graph is the projected energy used when control events are used, and the projected interruptible load available 1206 is the projected energy usage when control events are not used. The difference between the projected interruptible load usage 1204 and the projected interruptible load available 1206 is the capacity that may be used for operating reserve, including regulating reserve, spinning reserve, and non-spinning reserve.

Normally, when a utility observes energy demand that is near its peak capacity, it will attempt to initiate control events for customers who voluntarily participate in power saving programs (i.e., flexible load-shape programs, as described earlier). Typically, these control events will provide sufficient capacity to prevent the utility from using non-spinning reserve. However, there are situations in which a sufficient number of customers may have manually decided to opt out of power saving programs and, as a result, the utility would be unable to recover enough energy to meet its spinning reserve needs from its remaining customers who voluntarily participate in the program. Such a situation could happen, for instance, on a very hot day when many people are home, such as on a holiday or a day over the weekend. In such a case, the utility would still be in danger of using non-spinning reserve or even running out of reserve capacity altogether. In such a situation, the utility would be in a "critical control" mode. In critical control mode, the utility may override all customer preferences, including both those who voluntarily participate in power saving programs and those who do not. During periods of critical control, the utility may utilize the ALD 100 to adjust settings of environmentally-dependent devices to settings outside of normal comfort preferences (but not life-threatening). Invoking critical control enables a utility to return power demand to acceptable levels.

Use of the ALMS 10 may help a utility mitigate the likelihood of critical control situations. For example, whenever a customer overrides or opts out of a control event, the ALMS 10, using the techniques disclosed herein, finds additional customers who may be the target of a voluntary control event. Analogously, when controlled devices that are participating in a control event are required to exit the control event due to customer preferences (e.g., the amount of time that the customer's devices may participate in a control event), the ALD 100 may release such devices from the control event and replace them with other voluntarily controlled devices. The replacement devices would then preferably supply, through deferment, at least the same amount of reserve power as was being sourced by the devices that were released from the control event. Thus, the system 10 of the present invention increases the likelihood that a utility will be able to spread control events to other customers before invoking critical control.

In a further embodiment, the entire ALMS 10 described in FIG. 3 may also be implemented in a proprietary network that is IP-based, real-time, temperature-derived, verifiable, interactive, two-way, and responsive to Automatic Generation Control (AGC) commands to produce operating reserve power through implementation of control events.

In an additional embodiment of the present invention, the sampling data stored in the repository 500 using the operational flow of FIG. 5 could also include other factors (called "variability factors") related to power consumption, such as day of the week, humidity, amount of sunshine, or number of people in the household. This additional data would allow the projected energy usage and projected energy savings to be more accurate based on these additional factors. To make use of this data, the ALD 100 may obtain the additional data from sources within and/or external to the ALMS 10, such as weather databases, live weather feeds from sources such as National Weather Reporting stations, outdoor sensors 94, or any weather related input device commercially available on a real time or predictive basis, calendars, and voluntary customer feedback. Some of the variability factor measurements are available from public sources, while others are available via private sources.

In another alternative embodiment of the present invention, transmission line loss may be included in the projected energy savings determination of FIG. 11. As those of ordinary skill in the art will recognize and appreciate, the amount of power supplied by a utility to source a device remote from the utility equals the amount of power required by the device plus the amount of power lost in the transmission lines between the utility's power generation plant and the location of the device. Thus, the projected energy savings resulting from a control event may be determined by determining an amount of power expected to be consumed by the controlled device or devices at a service point, at multiple service points or throughout the entire service area of the utility during the time period of the control event absent occurrence of the control event to produce first energy savings, determining an amount of power that is not expected to be dissipated in transmission lines as a result of not delivering power to the controlled device or devices during the control event to produce second energy savings, and summing the first energy savings and the second energy savings.

Figure 13:
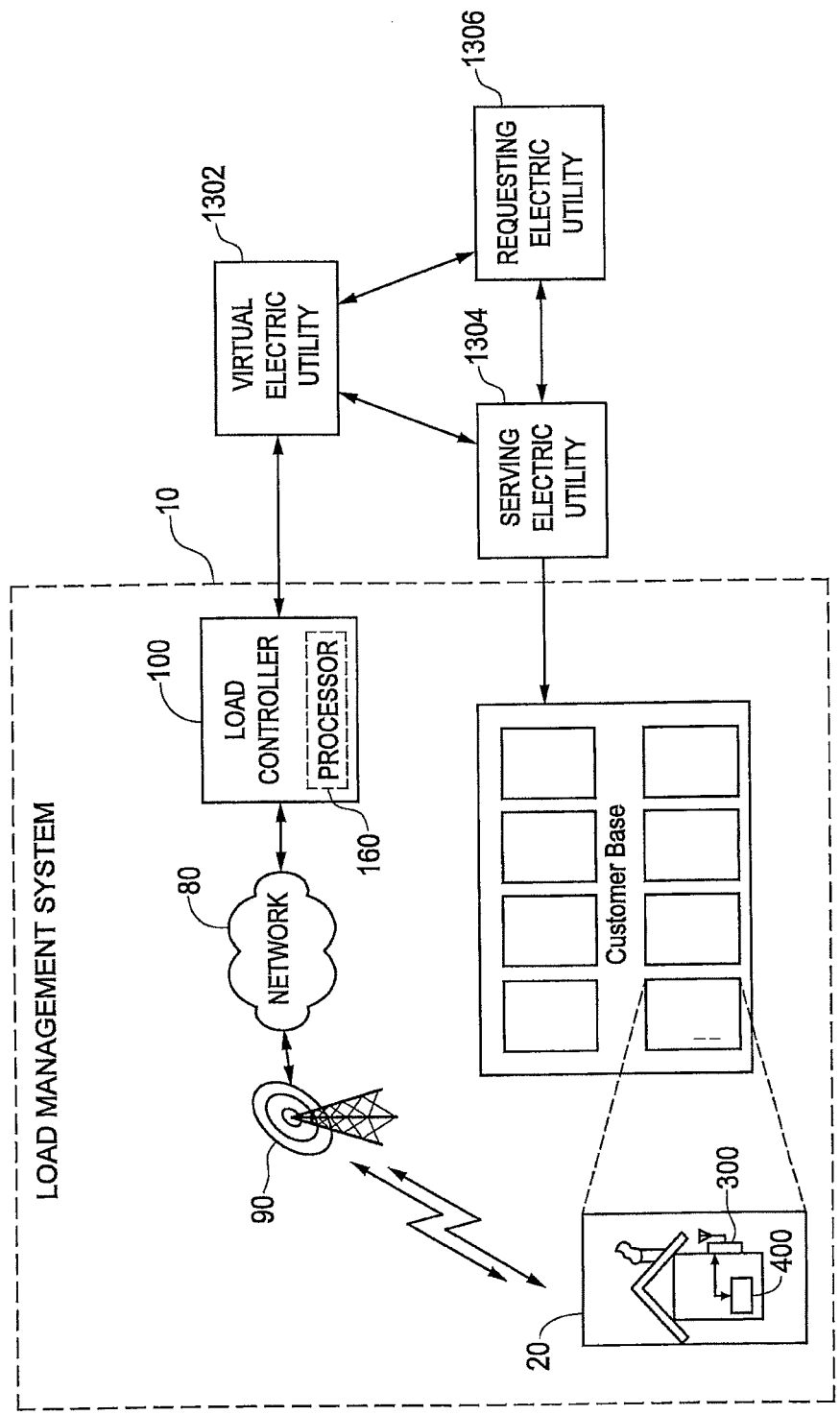
FIG. 13 is a block diagram of a system for implementing a virtual electric utility in accordance with an exemplary embodiment of the present invention.

In a further embodiment of the present invention, the operating reserve (e.g., spinning reserve or regulating reserve) determined by a utility using the techniques disclosed above can be sold to a requesting utility 1306, as illustrated in FIG. 13, which is essentially a replication of FIG. 9 of U.S. Patent Application Publication No. US 2009/0063228 A1. As explained in U.S. Patent Application Publication No. US 2009/0063228 A1, the saved power may then be distributed to the requesting utility 1306 after commencement of the control event (e.g., during and/or after completion of the control event) conducted by the selling utility. The selling utility may be a virtual utility 1302 or a serving utility 1304 as illustrated in FIG. 13 and described in detail in U.S. Patent Application Publication No. US 2009/0063228 A1. Alternatively, a third party may serve as a managing entity to manage operation of the ALMS 10 and the resultant distribution of operating reserve to a requesting utility 1306 subsequent to commencement of a control event.

In yet another embodiment, the ALD 100 for a utility may determine projected energy savings for each service point 20 served by the utility in accordance with the operational flow of FIG. 11 and aggregate the projected energy savings across all service points served by the utility to obtain the total projected energy savings from which operating reserve may be determined as described above.

In a further embodiment, instead of or in addition to using the operational flow of FIG. 10 in an attempt to find a best match data point in the repository 500 for use in estimating power consumption behavior of a device when the time period of the control event does not correspond to a time period in the repository 500, the ALD 100 may determine whether the repository 500 includes power consumption data for the device during time periods before and after the expected time period of the control event and, if so, interpolate a value corresponding to an amount of power expected to be consumed by the device during the time period of the control event based on the power consumption data for the device during the time periods before and after the expected time period of the control event.

In yet another embodiment, a requesting utility may utilize a method for acquiring operating reserve power from a sourcing utility. According to this embodiment, the requesting utility requests operating reserve power from the sourcing utility sufficiently in advance of a transfer time at which the operating reserve power will be needed so as to facilitate measurable and verifiable load-controlled generation of the operating reserve power. The load-controlled generation of the operating reserve power results from a determination of operating reserve as detailed above with respect to FIGS. 7-12. The requesting utility receives an acknowledgment from the sourcing utility indicating that the sourcing utility will supply the operating reserve power at the transfer time. Then, at the transfer time and for a time period thereafter, the requesting utility receives at least some of the operating reserve power from the sourcing utility.

In a further embodiment, the operating reserve determination techniques may be utilized by a virtual utility 1302 as disclosed in U.S. Patent Application Publication No. US 2009/0063228 A1. For example, the virtual utility 1302 may be operable to at least offer energy to one or more requesting utilities 1306 for use as operating reserve for the requesting utilities 1306. In such a case, the virtual utility 1302 may include, among other things, a repository 500 and a processor 160 (e.g., within an ALD 100). In this embodiment, the processor 160 is operable to remotely determine, during at least one period of time, power consumed by at least one device to produce power consumption data. The processor 160 is further operable to store the power consumption data in the repository 500 and, at the appropriate time, determine an expected, future time period for a control event during which power is to be reduced to the device or devices. The processor 160 is also operable to estimate, prior to commencement of the control event, power consumption behavior expected of the device or devices during the time period of the control event based at least on the stored power consumption data. The processor 160 is further operable to determine, prior to commencement of the control event, projected energy savings resulting from the control event based at least on the estimated power consumption behavior of the device or devices. Still further, the processor 160 is operable to determine, prior to commencement of the control event, operating reserve based on the projected energy savings. After determination of the operating reserve, the processor 160 is operable to communicate an offer to supply the operating reserve to a requesting utility 1306 or utilities.

In yet another embodiment, the service point 20 may optionally further include one or more power storage devices 62 (one shown in FIG. 3) on-site to store energy supplied by the utility or produced by one or more optional power generating devices 96 (one shown in FIG. 3). The power storage device 62 may be primarily used for power storage or, more typically, may have another primary purpose, such as power consumption, although storage of power is a secondary purpose. Normally, the power storage device 62 is plugged into the power grid and incrementally stores power which can be used or consumed later. One example of a power storage device 62 is an electric vehicle or a hybrid electric vehicle, which may be plugged into the power grid via a recharging station located at the service point. When not in use, the power storage device 62 may be plugged into an outlet at the service point 20 to draw and store energy from the utility's grid. The power storage device 62 may then be unplugged later and used for its primary purpose. In the example of an electric vehicle, the power storage device 62 is unplugged to be used for transportation. Alternatively, the power storage device 62 may, at a later time after being charged, serve as a source of power, akin to a power generating device 96. For example, an electric vehicle may be plugged into a socket at the service point 20 and have some or all of its remaining stored power supplied to the utility's grid when, for example, the vehicle owner is not planning on using the vehicle for awhile. In such a case, the vehicle owner could elect to supply power to the utility grid at high peak load times and receive or consume power from the grid at low peak load times, effectively treating stored power as a commodity. Alternatively, the owner of the power storage device 62 may allow the energy stored in the power storage device 62 to be considered energy available for use as operating reserve in the event the stored energy may be needed for such purpose by a serving utility 1304 or a requesting utility 1306.

The ALMS 10 of the present invention supports the inclusion or use of power storage devices, such as batteries or electric vehicles, at a service point 20. Referring again to FIG. 3, a power storage device 62 may be used to store and/or dispatch energy. When the power storage device 62 is located at a service point 20 and receives energy from the grid and/or from a local power generating device 96, the control device for the service point 20 (e.g., an active load client 300) notifies a central controller, such as the ALD 100. The ALD 100 logs the amount of energy supplied to and stored by the power storage device 62 and the time period of the storage activity in the ALD database 124. The ALD 100 may also determine the carbon footprint and the carbon credits associated with the storage activity as disclosed in U.S. patent application Ser. No. 12/783,415, which was published as U.S. Patent Application Publication No. US 20100235008 A1 on Sep. 16, 2010 and is incorporated herein by reference.

When the storage device 62 is used to send or dispatch energy into the power grid, the active load client 300 again notifies the ALD 100. The ALD 100 logs the amount of power dispatched and the time period of the dispatch activity in the ALD database 124. The ALD 100 may also determine the carbon footprint and the carbon credits associated with the dispatch activity as disclosed in U.S. Patent Application Publication No. US 20100235008 A1. For example, to determine the carbon footprint and carbon credits associated with the power dispatch activity, the ALD 100 may determine generation mixes relating to power supplied by the power grid to a service area containing the service point 20 at which the power storage device 62 was located during the dispatch and storage activities. The ALD 100 may then determine the net carbon credits earned, if any, resulting from the storage and dispatch activities by subtracting the carbon credits associated with the power storage activity from the carbon credits associated with the power dispatch activity, associate any earned credits with the service point 20 or the storage device owner, and store the earned credits in the utility power and carbon database 134. Thus, if the storage device 62 is charged by a utility during the night when much of the energy supplied by the utility comes from a carbon free source, such as wind turbines, and is then discharged or dispatched during the day and at a peak time when much of the energy supplied by the utility is being generated from sources that emit carbon dioxide, such as coal and gas, the dispatch of energy may result in net carbon credits earned by the service point 20 or the storage device owner as disclosed in U.S. Patent Application Publication No. US 20100235008 A1.

In one embodiment, the power stored in the power storage device 62 may be managed by the ALMS 10 (e.g., through a central controller, such as the ALD 100). Such management may involve controlling when the power storage device 62 will draw or store power and using power stored in the power storage device 62 when needed by a utility, including as operating reserve. Controlling when the power storage device 62 will draw power may involve specifying the best times for the power storage device 62 to draw power from the grid so as to, for example, minimize the carbon footprint associated with such storage activity or mitigate use of operating reserve by a utility. Allowing the ALMS 10 to control when power stored by power storage devices 62 is used enables a utility to draw power from power storage devices 62 during times of critical need, such as to maintain frequency regulation in response to AGC commands or to provide operating reserve in order to avoid a brownout or blackout. If power is allowed to be drawn from the power storage device 62 in response to a request from a utility 1304, 1306 to the ALMS 10, an alert may be sent to the customer, such as via the customer dashboard 98. The customer may be provided a reward, monetary credit or other benefit to encourage participation in storage device management.

Management of power storage devices 62 by the ALMS 10 may be provided through the customer dashboard 98 (e.g., as an extension to the customer sign-up application 116, as a separate power storage device management application, as part of the customer's energy program, or otherwise). The customer dashboard 98 may inform the customer as to preferred times for the power storage device 62 to be plugged into or otherwise connected to the power grid for purposes of storing power in the power storage device 62 and preferred times for the power storage device 62 to be plugged into or connected to the power grid for purposes of dispatching power from the power storage device 62 to the power grid so as to, for example, maximize the customer's earned carbon credits. Additionally, the customer may indicate through the customer dashboard 98 whether the power storage device or devices 62 may be used by the ALMS 10 as operating reserve for a serving utility 1304 or a requesting utility 1306. If the customer indicates that power stored in a power storage device 62, such as an electric vehicle or a hybrid electric vehicle, can be used by the ALMS 10 for any reason, the customer may also provide information related to the power storage device 62, such as type of device, device parameters or specifications (including charging and discharging parameters or characteristics, such as, but not limited to, charging rate, discharging rate, total storage capacity, and/or charger type), control module identifier associated with a controllable device to which the power storage device 62 will be connected for charging, and any other relevant information, by inputting such information into the ALD 100 via the customer dashboard 98.

Still further, the power storage device 62, such as an electric vehicle or a hybrid electric vehicle, may be implemented with wireless access technology such that the power storage device 62 may communicate its relevant information (e.g., type of device, state of charge, device parameters or specifications, location (e.g., where the power storage device 62 further includes location determination functionality, such as GPS), time since last recharge, and so forth) directly to the ALD 100 over a wide area wireless network via the communications interface 308. With such information, the ALD 100 or the active load client 300 may determine how much power has been stored and/or may be dispatched over time. Additionally, by knowing the power storage device's location, state of charge, and other parameters, the ALD 100 or other central controller may take such information into account in an attempt to balance the loading on or increase the supply to the grid (e.g., by directing the power storage device 62 to a certain area of the grid for recharging or power dispatching) or when responding to a power outage in a service area containing the power storage device 62. For example, in one embodiment, the ALD 100 may use the information gathered from mobile power storage devices 62, such as electric vehicles, to negotiate pricing with one or more utilities to supply power from the power storage devices 62 to the grid at grid points identified by the utility in order to assist with a low supply condition or to supply operating reserves.

Alternatively, due to the loading presented by certain power storage devices 62, such as electric vehicles (especially when using fast or rapid charging functionality), adding the loading of such devices onto the grid during a restart of power may cause an undesired power spike, which could damage the grid unless the utility utilizes its contingency reserve as a cold load pickup. Therefore, to reduce the strain on the grid during restart, while mitigating use of contingency reserve, the ALD 100 may intelligently control the restart of power to the affected utility service area, such as by using the controlled restart techniques described in detail in commonly-owned, co-pending U.S. application Ser. No. 12/896,307, which was published as U.S. Patent Application Publication No. US 20110022239 A1 on Jan. 27, 2011, and is incorporated herein by this reference. By regularly receiving updates of the locations of electric vehicles throughout a grid area, the ALD 100 can anticipate and project the impact on the grid due to electric vehicle recharging. Thus, during a controlled restart after a power outage, the ALD 100 can determine areas including service points 20 with high concentrations of electric vehicles needing recharging and configure those locations into the restart algorithm such that service points 20 with high electric vehicle concentrations are not restarted simultaneously. Alternatively, each power storage device 62 may be effectively treated as its own service point and include its own control device with functionality similar to an active load client 300, which device may communicate with the ALD 100 via a wide area wireless network or any other communication network and perform the operations of the active load client 300 with respect to the controlled restart process described in U.S. Patent Application Publication No. US 20110022239 A1. For example, due to the substantial loading presented by electric vehicles during recharging (especially rapid recharging), the ALD 100 may be configured to treat each electric vehicle as a service point (or at least each electric vehicle in an outage-affected service area) for purposes of implementing controlled restart. Alternatively, the ALD 100 may exploit knowledge of the mobile power storage devices locations to dispatch excess capacity back to the grid to assist with recovery from an outage (e.g., to serve as utility operating reserve in an outage recovery situation), such as may be permitted by the customer profiles associated with the power storage devices 20 and for dispatch or power delivery prices as may be negotiated with the utility by the ALD 100.

As an alternative to receiving locations of mobile power storage devices 62 directly from such devices 62 over a wireless network via their associated control devices, the ALD 100 may determine the locations of the devices 62 by receiving report messages from active load clients 300 at service points 20 at which the devices 62 are located. For example, an active load client 300 or similar control device at a service point 20 or within a recharging station may detect when the power storage device 62 coupes to the service point or station for recharging purposes. At such time, the control device may retrieve identification information for the power storage device and supply it to the ALD 100, which may then determine the device's location based on the location of the service point/recharging station.

In another embodiment, the power storage device 62 may be connected to the power grid at a service point other than its home or base service point. For example, an electric or hybrid electric vehicle may be plugged in at a house being visited by the owner or user of the vehicle. In such an example, the power storage device 62 (electric or hybrid electric vehicle) may still be managed by a central controller as described above. When the power storage device 62 is connected to the power grid and receives energy from the grid, a service point control device, such as an active load client 300, installed at the visited service point notifies the central controller (e.g., ALD 100) and provides an identifier (ID) of the power storage device 62. The ALD 100 logs the amount of power used and the time period of the storage activity in an entry of the ALD database 124, or other repository, associated with the device ID. The ALD 100 may also determine the carbon footprint and the carbon credits associated with the storage activity as disclosed in U.S. Patent Application Publication No. US 20100235008 A1.

When the power storage device 62 is used to send or dispatch energy into the power grid, the active load client 300 at the service point at which the power storage device 62 is currently located notifies the ALD 100 with the device ID of the power storage device 62. The ALD 100 logs the amount of power dispatched and the time period of the dispatch activity in the ALD database 124. The ALD 100 may also determine the carbon footprint and the carbon credits associated with the dispatch activity as disclosed in U.S. Patent Application Publication No. US 20100235008 A1. The ALD 100 may then determine the net carbon credits earned, if any, resulting from the storage and dispatch activities by subtracting the carbon credits associated with the power storage activity from the carbon credits associated with the power dispatch activity, associate any earned credits with the power storage device's home or base service point 20 or the storage device's owner, and store the earned credits in the utility power and carbon database 134.

Referring back to FIG. 4, the data associated with the storage and dispatch activities of the power storage device 62 may be received at the central controller (e.g., A:D 100) from the applicable service point control device (e.g., active load client 300) through the ALC interface 112 and the security interface 110. The data may be processed through the ALC manager 108 to the ALD database 124. The carbon savings application 124 may use the data to calculate power and carbon savings, which is stored in the utility power and carbon database 134. The power savings application 120 may use the data to determine the amount of power stored in the power storage devices 62, which may be available for use as operating reserve for a utility 1304, 1306.

To account for the mobility of power storage devices 62, the ALD database 124 optionally stores identifiers (IDs) for all controlled devices and storage devices 62 associated with each service point 20. When reporting power consumed, dispatched, or stored by a power consuming device or a power storage device 62, the active load client 300 includes the device ID with the device's respective data, thereby enabling the ALD 100 to associate the data with the correct device and/or service point in the ALD database 124. In this manner, the service point 20 for which the power storage device has been associated in the ALD database 124 receives credit for any net carbon credits earned as a result of the dispatch of power back to the grid from a power storage device 62 regardless of where within the utility's service area or elsewhere such dispatch occurs. The mobility of certain power storage devices 62, such as electric vehicles or hybrid electric vehicles, also facilitates use of the devices 62 as operating reserve at the various locations to which the devices 62 travel, as described in more detail below.

Figure 14:
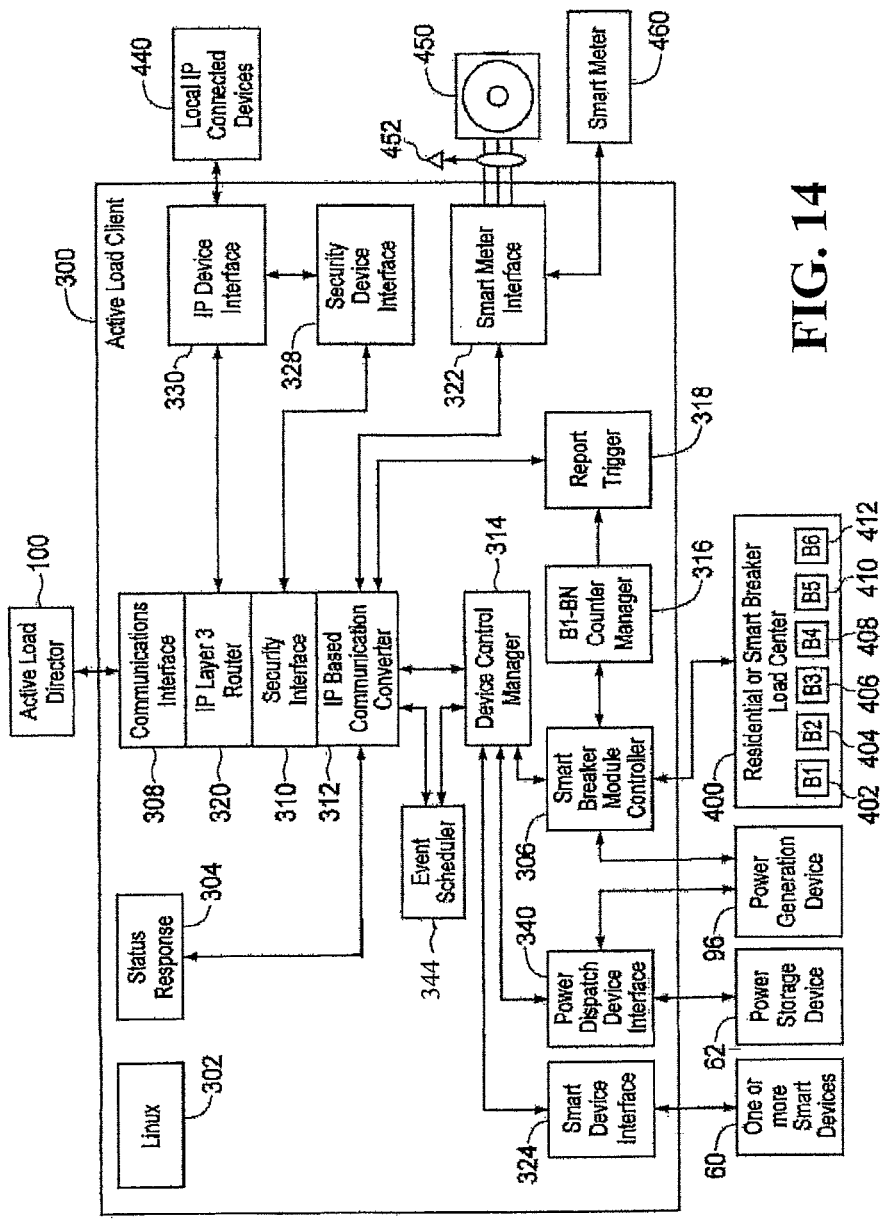
FIG. 14 is a block diagram illustrating an exemplary active load client and residential or smart breaker load center as used in the active load management system of FIG. 3.

FIG. 14 illustrates a block diagram of an exemplary active load client 300 (control device) and residential load center 400 as used in accordance with one embodiment of the ALMS 10 of FIG. 3. The depicted active load client 300 includes an operating system 302 (which may be Linux-based), a status response generator 304, a smart breaker module controller 306, a communications interface 308, a security interface 310, an IP-based communication converter 312, a device control manager 314, a smart breaker (B1-BN) counter manager 316, an IP router 320, a smart meter interface 322, a smart device interface 324, an IP device interface 330, a power dispatch device interface 340, and an event scheduler 344. The active load client 300, in this embodiment, is a computer or processor-based control system located on-site at a service point 20 (e.g., customer's residence or business). The primary function of the active load client 300 is to manage the power load levels of controllable devices located at the service point 20, which the active load client 300 oversees and controls on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60, managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. The active load client 300 may further include power dispatch functionality (e.g., power dispatch device interface 340) and provide information to the ALD 100 regarding power available for dispatch from a power generation device 96 and/or a power storage device 62 at the service point 20. Details regarding many of the components of the active load client 300 are disclosed in U.S. Pat. No. 7,715,951, and U.S. Patent Application Publication Nos. US 20090063228 A1, US 20100179670 A1, US 20100161148 A1, and US 20100235008 A1, all of which are incorporated herein by this reference. Additional details regarding operation of the active load client 300 and certain components thereof as such operation relates specifically to one or more embodiments of the present invention are provided below.

Figure 15:
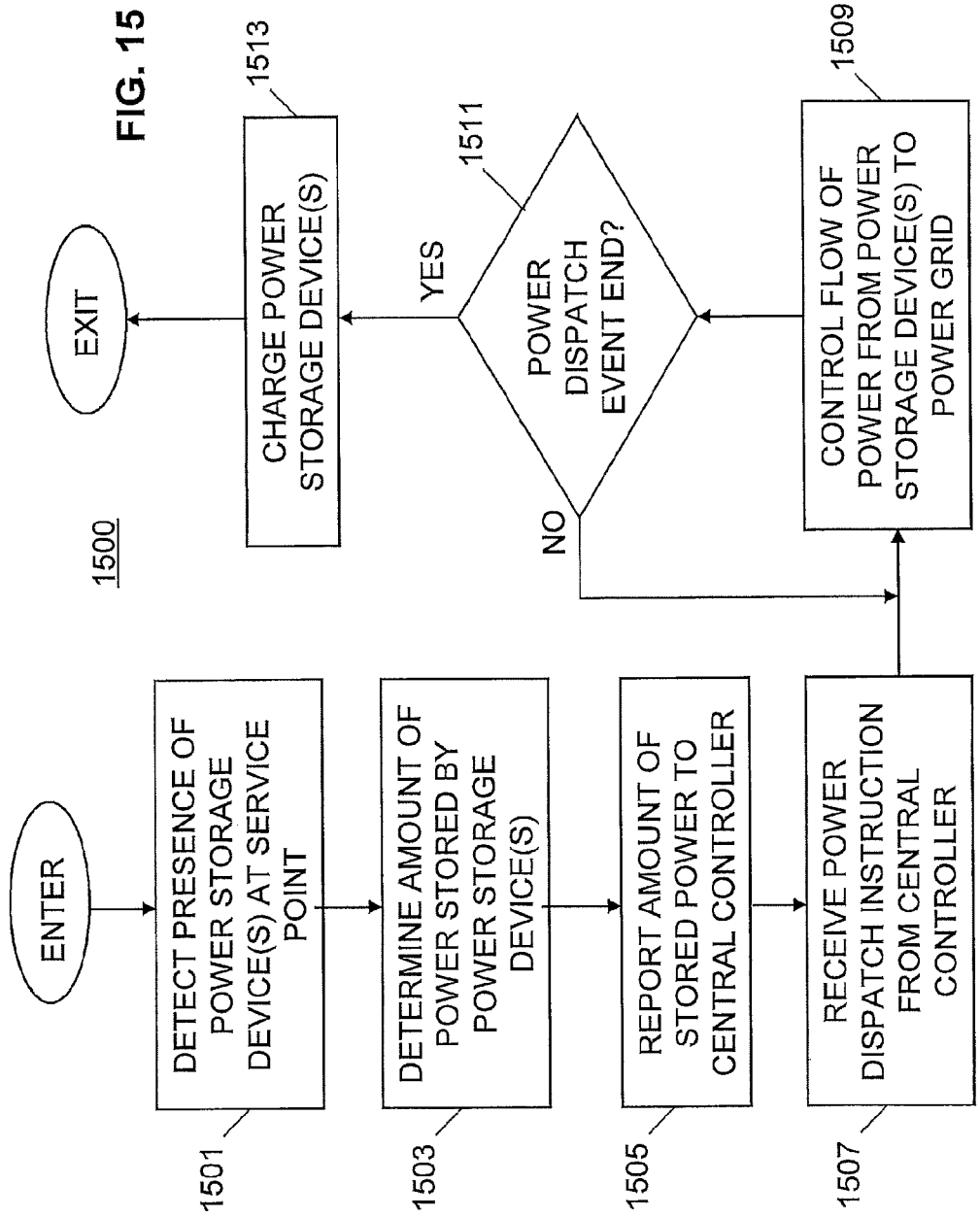
FIG. 15 is an operational flow diagram illustrating a method for a control device, such as an active load client, to supply to supply data to a central controller, such as an ALD 100, and power to a utility power grid to enable the central controller to project and deliver available operating reserve, in accordance with an alternative exemplary embodiment of the present invention.

Referring now to FIG. 15, such figure illustrates an exemplary operational flow diagram 1500 providing steps executed by a service point control device, such as an active load client 300, to supply data to a central controller, such as an ALD 100, and power to a utility power grid, in accordance with an alternative embodiment of the present invention. The method of FIG. 15 provides operational steps executed by the control device to assist the central controller in projecting and delivering available operating reserve resulting from power stored in one or more fully or partially charged power storage devices 62 located at a service point 20. The steps of FIG. 15 are preferably implemented as a set of computer instructions (software) stored in memory (not shown) of the control device and executed by one or more processors of the control device. For example, where the service point control device is an active load client 300, the operational flow of FIG. 15 may be executed primarily by the power dispatch device interface 340, the device control manager 314, and the event scheduler 344. In one embodiment in which the power storage device 62 is an electric vehicle, the control device implementing the method of FIG. 15 may be integrated into a charging station for use by electric vehicles.

One or more power storage devices 62, such as electric vehicles, hybrid electric vehicles, or batteries, may be connected to the power grid at one or more service points 20. Where the power storage devices 62 are electric or hybrid electric vehicles, the service points 20 may include vehicle recharging stations from which the vehicles may be recharged (e.g., via a plug-in or wireless charger for the vehicle). The active load client 300 or a similar control device at the respective service point 20 detects (1501) the presence of a power storage device 62 at the service point 20 via the power dispatch device interface 340. For example, the power dispatch device interface 340 may include a switching circuit that detects when a power storage device 62 or a power generating device 96 is communicatively coupled to the active load client 300 or a control module in communication with the active load client 300. Such a control module may be integrated into a vehicle recharging station or other grid connection point at the service point 20. Alternatively, each recharging station may include its own active load client 300 or other similarly functioning control device; provided, however, that the control device incorporated into a charging station may not include all of the functionality of an active load client 300 so long as the control device includes at least the functionality necessary to carry out one or more embodiments of the present invention.

The active load client 300 may alternatively determine that a power storage device 62 is present at the service point 20 by receiving a registration and/or authentication request from the power storage device 62 via the power dispatch device interface 340. The active load client 300 may receive such a request either directly (e.g., where the active load client 300 is located within a vehicle recharging station) or via a controllable device (e.g., a Zigbee, Wi-Fi, or BPL control module) connected between the storage device 62 and the active load client 300, such as within a vehicle recharging station. The power dispatch device interface 340 notifies the device control manager 314 of the presence of the power storage device 62, which in turn provides information regarding the power storage device 62 (e.g., type of device, device parameters or specifications (including charging and discharging parameters or characteristics), control module identifier associated with the controllable device to which the power storage device 62 will be connected for charging, and so forth) to the ALD 100 via an applicable communication protocol (e.g., IP over HSPA or LTE). Alternatively or additionally, a service point customer may inform the ALD 100 that a service point includes or will include a power storage device 62 by inputting information related to the power storage device (e.g., type of device, device parameters or specifications (including charging and discharging parameters or characteristics), control module identifier associated with a controllable device to which the power storage device will be connected for charging, etc.) into the ALD 100 as customer personal settings 138 (e.g., a customer profile) via the customer dashboard 98. Where the power storage device 62 is an electric vehicle or hybrid electric vehicle, the customer profile for the device may include parameters for charging the vehicle (e.g., preferred charging time period, preferred electricity rate price, and so forth) that conform with a utility's pricing policies for electric vehicles and that may enable the customer to receive a rate incentive for charging the vehicle at times that are considered "off peak," where operating reserves are not typically required. The rate incentive may be referred to as a "Time of Use (TOU)" price point, which may be unique for electric vehicles at the option of the utility. The customer profile may also include market signals and bidding rules which would allow for charging of the power storage device 62 to cease for brief periods of time in response to a call to dispatch operating reserves, which may be received from the utility through a central controller, such as the ALD 100.

After the active load client 300 has notified the ALD 100 that a power storage device 62 is coupled to the electric power grid at a service point 20, the ALD 100 may manage the flow of power to and from the storage device 62 through messaging to the active load client 300. In such regard, the active load client 300 may periodically, or responsive to polling, inform the ALD 100 as to an amount of power stored in the power storage device or devices 62 at the service point 20 so that the ALD 100 may take such power into account when estimating the amount of operating reserve available at the service points 20 under the ALD's control. For example, in one embodiment, the active load client 300 (or another control device at the service point 20) determines (1503) an amount of electric power stored by the power storage device or devices 62 at the service point 20. The active load client 300 may make such determination by receiving stored power reports from each power storage device 62 via the power dispatch device interface 340 or by estimating the stored power based on a length of time that the power storage device 62 has been charging and the charging characteristics of the storage device (e.g., the charging rate or profile of the power storage device 62). The active load client 300 may determine that a power storage device 62 is fully charged upon determining that the power storage device 62 is still electrically coupled to the power grid at the service point 20, but is no longer receiving power from the power grid (e.g., as determined by a current meter or a power control module in an electric vehicle recharging station). Alternatively, the power storage device 62 may send a message to the active load client 300 via the power dispatch device interface 340 informing the active load client 300 of the device's fully or partially charged status (as well as optionally informing the active load client 300 as to the storage device's quantity of stored power). The amount of power stored or estimated to be stored in each power storage device 62 at a particular service point 20 may be stored in the active load client 300 for the service point 20.

After determining the amount of power stored in the power storage device or devices 62 at the service point 20, the active load client reports (1505) the amount of stored power to the ALD 100. The stored power reporting may be on a storage device-by-storage device basis or on a service point basis. The stored power information may be stored in a central repository at the ALD 100 (e.g., the ALD database) or otherwise accessible by the ALD 100. As discussed in detail above, the central repository may also store power consumption data for controlled devices at the service points 20 from which the ALD 100 may project or estimate available operating reserve attainable through control events. In order to continually or at least regularly be prepared to supply a utility 1304, 1306 with operating reserve through power dispatched from power storage devices 62 and/or power saved through load-deferring control events, the ALD 100 may determine the total amount of available operating reserve by summing the stored power from power storage devices 62 at service points 20 under the ALD's general control with the amount of projected energy savings available from such service points 20 as a result of load deferment during control events.

When operating reserve is required from the ALD 100 (e.g., responsive to a request from a utility 1304, 1306, such as a market signal from an ISO or an AGC command, such as a regulation up ("Reg Up") request or signal, from a utility's AGC system), the ALD 100 may instruct one or more active load clients 300 to discharge their power storage devices 62 and optionally commence control events. Thus, each active load client 300 to be so instructed receives (1507) a power dispatch instruction from the ALD 100 and, responsive thereto, controls (1509) a flow of electric power from one or more power storage devices 62 to the power grid to assist with meeting the utility's need for operating reserve. The power dispatch instruction may form part of a control event instruction (e.g., "Cut" message) or may be separately sent to the active load clients 300. The power dispatch instruction may indicate a predetermined amount or percentage of power stored in a power storage device 62 to dispatch back to the grid. The predetermined amount or percentage may be specified in a customer profile for the service point 20 or may be determined based on the type of device (e.g., due to parameters of the device, such as discharge limitations). For example, a customer profile may limit the power that can be dispatched from a power storage device 62 to no more than 50% or 75% of the storage device's capacity. When a control event is commenced at a service point 20 in connection with supplying operating reserve and a power storage device 62 is in process of being charged at the service point 20, the active load client 300 at the service point 300 (e.g., for the entire service point or within, for example, a vehicle charging station) may instruct the power storage device 62 or an associated control module to cease the charging process in order to make the power which would otherwise supplied to the power storage device 62 available for operating reserves. When the active load client 300 determines (1511) that the power dispatch event (which may have coincided with a power reduction control event) has ended, the active load client 300 may again begin charging (1513) the power storage device 62.

Figure 16:
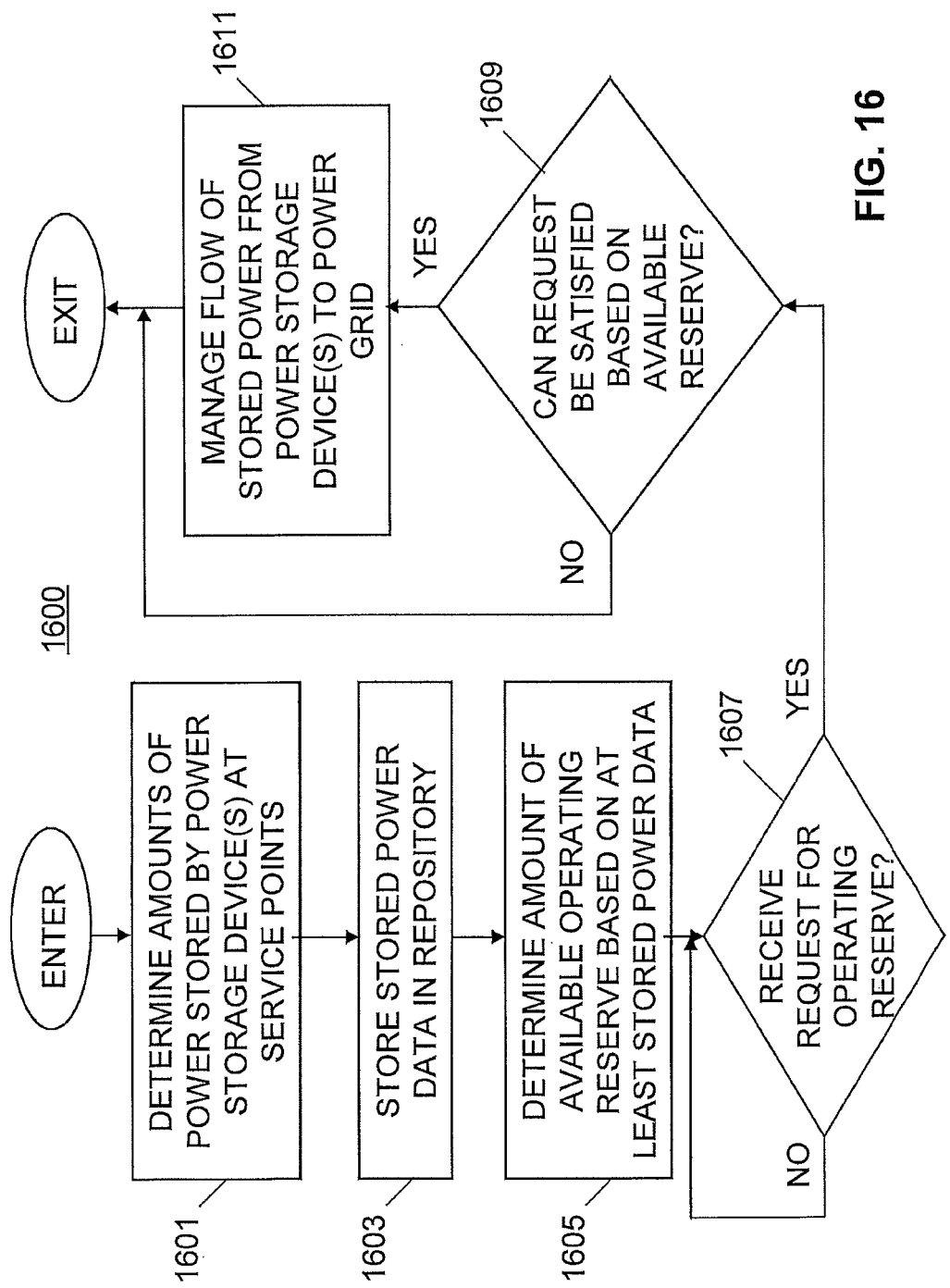
FIG. 16 is an operational flow diagram illustrating a method for estimating and supplying operating reserve to a utility in accordance with another exemplary embodiment of the present invention.

Referring now to FIG. 16, such figure illustrates an exemplary operational flow diagram 1600 providing steps executed by a central controller, such as an ALD 100, to estimate (e.g., project) and supply available operating reserves resulting from power stored in fully or partially charged power storage devices 62, in accordance with an alternative embodiment of the present invention. The steps of FIG. 16 are preferably implemented as a set of computer instructions (software) stored in memory (not shown) of the central controller and executed by one or more processors 160 of the central controller. The operational flow of FIG. 16 may be executed by the master event manager 106 and the ALC manager 108 in advance of and/or in response to a request for operating reserves.

According to the operational flow of FIG. 16, the central controller determines (1601) amounts of electric power stored by devices 62 located at one or more service points 20 to produce stored power data. As discussed above, the central controller may receive state of charge and other device parameters from control devices located at the service points 20 or optionally from the devices 62 directly where, for example, the devices 62 include applicable functionality for communicating directly with the central controller. Where the devices 62 are electric vehicles, the control devices may be located in electric vehicle charging stations, such that a charging station control device controls flows of power to and from an electric vehicle electrically coupled to the charging station. Alternatively, the control devices (e.g., active load clients 300) may be located more generally at the service points 20, such as at or near the main power panel or power meter for the service point, and control flows of power to and from several devices. Still further, each electric vehicle may include its own control device that communicates over a wireless network with the central controller. Such communications may include state of charge and other information from which the central controller may determine the amount of stored power. The central controller stores (1603) the stored power data or information for the devices 62 as respective entries in a repository, such as the ALD database 124. The determination and storage of data relating to the amounts of power stored in the devices 62 may occur regularly or periodically so that the central controller maintains an updated set of stored power data.

After determining the amounts of stored power in power storage devices 62 dispersed throughout a utility's service area, the central controller may determine (1605) a current amount of available operating reserve based on at least the stored power data. For example, the central controller may determine, from the stored power data and other information, such as customer profiles associated with the devices 62 and/or the service points at which the devices 62 are located, the amount of stored power that is deliverable to the grid in the time period required under FERC or NERC regulations to qualify as operating reserve. For example, the central controller may determine which devices 62 are electrically coupled to the grid and any limitations on using the stored capacity of such devices 62 in view of customer profile restrictions (e.g., capacity percentage limits, etc.) to determine the amount of currently available operating reserve resulting from the power stored in the devices 62. Because power storage devices, such as electric vehicles, may intermittently couple to and uncouple from the grid, and move throughout a utility service area or between utility service areas, the stored power available for use as operating reserve may change on a regular basis. The central controller tracks the changes in stored power amounts and the amounts of such stored power available for operating reserve in order to estimate available operating reserves for purposes of responding to operating reserve requests (e.g., AGC commands). In one embodiment, the amounts of power stored in devices 62 as reported by the devices 62 or by service point control devices are used to determine available operating reserve. Alternatively, and more preferably, the amounts of stored power (stored power data) are considered in combination with projected energy savings resulting from a control event, and optionally power generated by power generating devices 96 at the service points 20, in order to determine the total amount of available operating reserve in the system. Thus, the determination of the amounts of stored power in power storage devices 62 at the service points may be integrated into the operating reserves determination detailed above with respect to FIGS. 2-13 such that the amount of available operating reserve determined (1605) by the central controller takes into account both the projected energy savings resulting from a control event and the stored energy available from power storage devices 62 within a utility service area.

After the available operating reserve has been determined, the central controller determines (1607) whether a request for operating reserve has been received from a utility. When operating reserve is required from the central controller, the central controller may receive a request for operating reserve from a utility 1304, 1306, such as a market signal from an ISO or an AGC command, such as a "Reg Up" request or signal, from a utility's AGC system. When such a request is received, the central controller may determine (1609) whether the central controller can satisfy the request with the currently available operating reserve. If the central controller determines that the operating reserve request cannot be satisfied, the central controller may inform the utility and/or not respond to the request. If the central controller determines that the operating reserve request can be satisfied, the central controller may manage (1611) a flow of stored electric power from the power storage devices 62 to a power grid accessible by the utility. For example, the central controller may instruct one or more control devices (e.g., active load clients 300) to discharge their power storage devices 62 to the grid and optionally commence control events. According to one embodiment, the central controller may send a power dispatch instruction to each control device associated with a power storage device which the central controller determined has power that can be delivered to the grid to assist with meeting the utility's need for operating reserve. The power dispatch instruction may form part of a control event instruction (e.g., "Cut" message) or may be separately sent to the control devices. The power dispatch instruction may indicate a predetermined amount or percentage of power stored in a power storage device 62 to dispatch back to the grid. The predetermined amount or percentage may be specified in a customer profile for the service point 20 or may be determined based on the type of device (e.g., due to parameters of the device, such as discharge limitations). For example, a customer profile may limit the power that can be dispatched from a power storage device 62 to no more than 50% or 75% of the storage device's capacity. When a control event is commenced at a service point 20 in connection with supplying operating reserve and a power storage device 62 is in process of being charged at the service point 20, the control event instruction issued by the central controller may cause the control device at the service point 300 (e.g., for the entire service point or within, for example, a vehicle charging station) to instruct the power storage device 62 or an associated control module to cease the charging process in order to make the power which would otherwise be supplied to the power storage device 62 available for operating reserves. When the power dispatch event (which may have coincided with a power reduction control event) has ended, the control device may again begin charging the power storage device 62.

One exemplary embodiment for using power storage devices 62 to source operating reserve on demand utilizes an electric vehicle or hybrid electric vehicle (collectively, "electric vehicle") subsystem within the ALMS 10. The subsystem may include a control device, such as an active load client 300, either within a vehicle charging station or within the electric vehicle itself to enable the electric vehicle to receive charging information from the central controller (e.g., an ALD 100). In this embodiment, the electric vehicle has the unique ability to deliver some or all of its power in response to receiving an instruction (e.g., from the central controller) the electric vehicle to charge or deliver electricity in response to a signal from a utility (including a grid operator or an ISO), NERC, FERC or any other entity that routinely publishes market pricing for operating reserves, including spinning and non-spinning reserves. Electric vehicles represent a unique use case for the grid operator due to their ability to move both their electric consumption and their capability for electric power delivery to different locations within a grid. Since grid elements are stationary and may possess different loading (Volts/Vars/KVA) on their infrastructure, the ability to control the impact of electric vehicles on the grid via an ALMS 10 and its components (e.g., an ALD 100 and active load clients 300) may be important to maintaining grid stability. In this embodiment, an electric vehicle located at its "home" or base location (e.g., the service point associated with the owner of the electric vehicle) utilizes a charging station equipped with a control device, such as an active load client 300. The charging station is an environmentally-independent, resistive device for charging an electric vehicle's battery or battery bank. A customer utilizing or subscribing to an ALMS 10 may establish a profile for charging the electric vehicle (e.g., through the customer dashboard 98) that complies with a utility's pricing policies for electric vehicles, which may include a rate incentive for charging electric vehicles at times that are "off peak" (i.e., when operating reserves may not be required). The rate incentive may be a "Time of Use (TOU)" price point, which may or may not be unique for electric vehicles. Furthermore, the customer profile may also contain market signals and bidding rules for an electric vehicle to cease charging for brief periods of time in response to a call to dispatch operating reserves by the utility through the ALMS 10 (e.g., in response to a control message from the ALD 100 to an active load client 300 associated with the vehicle, its charging station, or the service point at which the charging station is located).

During an event where operating reserves are dispatched by the utility, the grid operator, or called upon by the ISO as a response to a bid to provide those resources by the utility customer, the electric vehicle may have its associated customer profile instructions altered to comply with the operating reserves required. For example, an ISO may dispatch a synchronized reserve/spinning reserve through a normal market signal. Under this scenario, depending upon the rules established by the Regional Transmission Organization (RTO) or ISO, the request for operating reserves would require a response within 10-15 minutes. If the ALMS 10 determines that it can satisfy the request for operating reserves, the ALD 100 may send a "Cut" message to the active load client 300 controlling a supply of power to the electric vehicle to interrupt the vehicle's charging sequence. The "Cut" message may be sent in conjunction with a control event at the service point 20 containing the electric vehicle or may be limited to a dispatch event, in which power may only be dispatched from power storage devices 62, including the electric vehicle, in response to the call for operating reserves. The active load client 300 may determine the charging state of the electric vehicle at the time of the "Cut" message, including the percentage of charge completed and/or the amount of energy available for delivery from the battery of the electric vehicle, and report the electric vehicle's state of charge, the active load client's compliance with the "Cut" message, and a measurement of load removed to the ALD 100. The ALD 100 may then store the data received from the active load clients 300 under the ALD's control in a repository, such as the ALD database 124, and supply the relevant information, such as aggregate power available for dispatch from electric vehicles and other power storage devices 62 and/or aggregate load removed, to the ISO under the ISO rules and in a format specified by the utility, grid operator, RTO, or ISO for settlement.

With respect to regulation or regulating reserves as may be requested by an AGC subsystem, the ALMS 10 (e.g., ALD 100) may receive telemetry commands from the AGC subsystem utilized by the utility, grid operator, RTO or ISO in compliance with the ACE equation. The commands may indicate the difference in the ACE equation representing frequency and voltage deviations. For example, a "Reg Up" command may indicate that power must be returned to the grid to return the ACE to zero; whereas, a "Reg Down" command may indicate that power must be removed from the grid to return the ACE to zero. These "Reg Up" and "Reg Down" commands must be acknowledged by the ALMS 10 (e.g., the ALD 100) within a time window defined by the requesting entity or a governing body, such as NERC or FERC. The AGC commands may also include the ACE equation for the utility to allow the ALD 100 to determine the appropriate response necessary to return the ACE to or near zero. Once the ACE equation is received, the ALD may issue a "Cut" message or a "Turn On" message to the active load client 300 to compensate for any frequency deviation in the ACE and to correct the deviation as instructed by the AGC subsystem. In one embodiment, the active load client 300 may cause power stored in the vehicle's battery to be delivered to the grid in response to a "Reg Up" command, which indicates that more power is required to bring the ACE equation (and the frequency on the grid being controlled) back to compliance (e.g., ACE=0).

The present invention also takes into account the mobility of the electric vehicle. Substations, transformers, and transmission and distribution lines do not move and the relative loading on each of these grid elements may be different depending on the overall loading of the grid at different times of the day. Thus, an electric vehicle's movement to various charging stations that are in a remote or foreign location from the vehicle's "home" location may allow the utility to establish an electric vehicle load pattern throughout the grid, especially where the vehicle regularly or repeatedly recharges at the same locations (e.g., work locations, restaurants, shopping malls, etc.). Electric vehicle travel patterns may also be determined through receipt by the ALD 100 of location data from the vehicles (e.g., from the vehicles' integrated GPS units or from other GPS units used with the vehicles, such as portable GPS units or GPS functionality embedded in cell phones or smart phones and communicated to the vehicles' embedded control devices via short-range wireless links). Knowledge of electric vehicle travel patterns may also allow the utility to develop zonal charging and delivery points for electric vehicles, thereby potentially requiring more precise control by the ALMS 10. According to one embodiment, an active load client 300 at any charging station, whether home or foreign, may determine the "state" of the electric vehicle, the preferences of the customer associated with the electric vehicle, and the current grid conditions (e.g., percentage of charge for the electric vehicle's battery, preferences of consumer, preferences of the utility/grid operator, current market conditions as reported by the ISO) when the electric vehicle is in close proximity to the station (e.g., electrically or communicatively coupled to the station) by receiving data from the vehicle, measuring parameters of the vehicle battery, and receiving customer and grid-related information from the ALD 100.

According to a further embodiment, the electric vehicle may be supplied with customer and grid-related information (e.g., including information regarding open requests for operating reserves) while the electric vehicle is mobile by sending the relevant information from the ALMS 10 over packet networks via machine to machine (M2M) connections as facilitated by the various wireless network configurations described above (e.g., GSM, HSPA, LTE, CDMA, and so forth). The information transmitted to the electric vehicle from the ALMS 10 (e.g., ALD 100) via M2M connections provides the electric vehicle with a regularly-updated status of the grid condition, market prices, and the need for operating reserves while the electric vehicle is in motion, at its home charging station, or at a foreign charging station. The status information supplied to the electric vehicle informs the vehicle of various system conditions based upon customer profile and specific overrides due to market conditions and/or utility operations/grid operations available to be executed by the ALD 100. Additionally, the electric vehicle may include a control device that sends M2M information packets to the ALD 100 informing the ALD 100 of its location, current state of charge, and other parameters. The ALD 100 may use such information to inform a utility of potential loading issues and receive feedback from the utility as to whether control devices (e.g. active load clients 300) managed by the ALD 100 may allow electric vehicles to recharge at certain locations and at certain times. The information supplied by the electric vehicles may also provide the ALD 100 with an opportunity to negotiate the dispatch of electric power from electric vehicles with excess capacity (e.g., more capacity than required to reach a target destination or which are currently immobile), which are located in utility service areas in need of capacity (e.g., operating reserve).

Data for an electric vehicle may be stored in a database along with its last known address location (e.g., as determined from GPS coordinates wirelessly reported by the electric vehicle via its active load client 300 or other control device), such as an "Electric Vehicle Charging Visitor Location Register" (EVCVLR) database contained within the ALMS 10. Additionally, when the electric vehicle has returned to its "home" charging station, the data for the electric vehicle may be stored in a corresponding "Home Location Register" (HLR) database within the ALMS 10. The electric vehicle may register and be authenticated at each charging station in order to maintain a level of security for the information exchanged between the charging station (foreign/visited or home) and the electric vehicle. The EVCVLR and HLR database entries may allow the consumer to travel to foreign locations and participate in events, such as power dispatch or charging cessation events, for supplying operating reserves to the grid. Participation in such events may enable the owner of the electric vehicle to receive compensation for providing operating reserves while away from its home charging station. Additionally or alternatively, inclusion of the EVCVLR and HLR databases in the ALMS 10 provide a method of billing "clearing" for electric vehicles that charge using unsophisticated chargers (e.g., chargers that doe not include their own ALMS-reporting control devices) at locations or through charging stations that are outside of the vehicle's home utility service area or that do not include or are not otherwise associated with an ALMS control device, such as an active load client 300. In all use cases, the ALMS 10 (e.g., through communication from the electric vehicle to the ALD 100) may register the vehicle's location (e.g., as determined using GPS or otherwise) and preferences set up in the ALMS 10 (e.g., customer profile), and receive location/geodetic specific commands from the utility, grid operator, RTO or ISO to comply with grid conditions or in response to market conditions, such as bid responses, to deliver operating reserves.

The methods disclosed above for projecting and supplying operating reserve in response to utility requests may be utilized by the ALMS 10 to implement a virtual utility 1302, such as detailed above with respect to FIG. 13 and described generally in U.S. Patent Application Publication No. US 2009/0063228 A1. In such a case, the virtual utility 13-2 may include a repository and a processor, such as the ALD database 124 and processor 160 supplied by the ALD 100. In this case, the processor may be programmed or otherwise operable to perform the various operating reserve projection and delivery functions described above. For example, the virtual utility 1302 may be operable through the processor to determine amounts of electric power consumed by a first set of remotely located devices (e.g., power consuming devices at service points 20 in a utility service area) during at least one period of time to produce power consumption data. The virtual utility 1302 may also be operable through the processor to determine amounts of electric power stored by a second set of remotely located devices (e.g., power storage devices 62, such as batteries or electric or hybrid electric vehicles at the service points 20 in the utility service area) to produce stored power data. The processor may then store the power consumption data and stored power data in the repository.

At a later point in time (i.e., after storage of the power consumption data and stored power data in the repository), the virtual utility 1302 may be operable through the processor to determine that a control event is to occur during which a supply of electric power is to be reduced to the first set of devices. The determination may be made in response to a request from a utility. For instance, an AGC system of the utility may issue an AGC command, such as a Reg Up command, requiring a reduction in load and/or an increase in supply in order to correct and stabilize (i.e., regulate) the frequency of the power supplied by the utility (i.e., in order to get the utility's ACE equal to or near zero). Such a condition and need for regulating reserve may occur as a result of under-generation by a utility's renewable energy sources, such as wind power and solar power, during certain time periods when the utility typically relies upon such energy sources for power. Upon making a determination that a control event is to occur, the virtual utility 1302 may be operable through the processor to estimate, prior to commencement of the control event and under an assumption that the control event is not to occur, power consumption behavior expected of the first set of devices during a first period of time based at least on the stored power consumption data, wherein the control event is expected to occur during the first period of time. The details for making such an estimation are disclosed in exemplary form above with respect to FIGS. 8-11.

Having estimated the power consumption behavior expected of the first set of devices during the expected time period of the control event, the virtual utility 1302 may be further operable through the processor to determine, prior to commencement of the control event, projected energy savings resulting from the control event based at least on the estimated power consumption behavior of the first set of devices. The projected energy savings may be determined on a service point by service point basis or on a utility-wide basis. Where the virtual utility 1302 and its associated central controller (e.g., ALD 100) control devices at multiple service points 20 through local control devices (e.g., active load clients 300), the virtual utility's processor may determine an intermediate projected energy savings for each service point 20 at which one or more devices are to be affected by the control event and aggregate or sum the intermediate projected energy savings for all the service points 20 to produce a utility-wide or at least aggregate projected energy savings. The projected energy savings for a single service point 20 may be the projected savings resulting from participation in the control event by each controlled power consuming device at the service point 20 as well as from ceasing the charging process to each power storage device 62 at the service point 20 which would otherwise be receiving charging power absent the control event.

The virtual utility 1302 may be further operable through the processor to determine, prior to commencement of the control event, an amount of operating reserve based on the projected energy savings and the stored power data. Thus, by having accurate, historical knowledge of how power consuming devices may be expected to perform at various times and having knowledge of how much stored power is available for control by the virtual utility 1302, the virtual utility 1302 can accurately project, in real time, its ability to meet the operating reserves needs of a requesting utility and, therefore, informatively bid for supplying operating reserves to requesting utilities. If the virtual utility 1302 is engaged to supply the requested operating reserves, the virtual utility 1302 may be further operable through the processor to distribute and/or manage distribution of the needed amount of operating reserves to the requesting utility or utilities subsequent to commencement of the control event.

In an alternative embodiment, depending on the operating reserve needs of the requesting utility as, for example, indicated in the operating reserves request (e.g., ISO market signal or AGC Reg Up command), the virtual utility 1302 may only dispatch power from power storage devices 62 without initiating any control events for power reduction or load deferment. Such may be the case where the stored power available for use as operating reserves and accessible by the virtual utility 1302 is sufficient to meet the utility's operating reserve needs.

Those of ordinary skill in the art will readily recognize and appreciate that the process disclosed above for projecting and supplying operating reserve in response to utility requests may be utilized by any utility incorporating an ALMS 10 that includes a central controller and a set of control devices, such as may be implemented as the ALD 100 and active load clients 300 disclosed above. Thus a serving utility 1304 may utilize the present invention to project and supply its own operating reserves or may offer such operating reserves on the open market (e.g., responsive to ISO market signals).

As described above, the present invention encompasses a system and method for determining and supplying operating reserve capacity using an ALMS that includes a central controller, such as an ALD, and multiple control devices, such as active load clients, dispersed throughout a geographic area (e.g., one or more utility service areas) to dispatch stored power from power storage devices coupled to the power grid. When a utility requires power beyond its native load, the utility must make use of its operating reserve or acquire the additional power via the FERC grid from other utilities. As discussed above, operating reserve includes spinning reserve and regulating reserve. Spinning reserve is additional generating capacity that is already connected to the power system and, thus, is almost immediately available. Regulating reserve is also capacity coupled to the power grid that may be supplied on extremely short notice to respond to line frequency fluctuations. In accordance with one embodiment of the present invention, a central controller, such as the ALD, makes spinning reserve and/or regulating reserve available to a utility by dispatching power stored in power storage devices coupled to the power grid. In accordance with another embodiment, the central controller may aggregate the dispatch of stored power from power storage devices together with power conservation through control events to provide operating reserve to a requesting utility. Thus, through use of the ALMS, a utility can determine or project spinning reserve or other operating reserve that is available through interruptible power savings and stored power at service points. The supplied operating reserve is measurable and verifiable, and can be projected for a number of hours or days in advance, thereby enabling such projections to be sold to other utilities on the open market.

As disclosed above, the ALMS 10 may be considered to implement a type of flexible load-shape program. However, in contrast to conventional load control programs, the load-shape program implemented by the ALMS 10 projects an amount of operating reserve resulting from selective control of devices (loads or storage devices) based on known, real-time customer preferences. In addition, due to its communication and control mechanisms, the ALMS 10 can project power savings, as well as operating reserve (e.g., regulating, spinning and/or non-spinning reserve) that is active, real-time, verifiable, and measurable so as to comply with protocols and treaties established for the determination of carbon credits and offsets, as well as renewable energy credits. The information acquired by the ALMS 10 is not simply samples of customer preferences and data, but actual power consumption information.

In the foregoing specification, the present invention has been described with reference to specific embodiments. However, one of ordinary skill in the art will appreciate that various modifications and changes may be made without departing from the spirit and scope of the present invention as set forth in the appended exemplary claims. For example, the passive sampling algorithm of FIG. 8, the projected energy usage algorithm of FIG. 9, the best sampling match algorithm of FIG. 10, and the projected energy savings algorithm of FIG. 11 may be performed by one or more equivalent means. Additionally, all functionality disclosed as being performed by an active load client 300 may instead be performed by an alternative control device (e.g., an electric vehicle recharging station or other control device) located at a service point. Further, all functionality disclosed as being performed by an ALD 100 may instead be performed by an alternative central controller communicatively coupled between one or more utilities and one or more service point control devices. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A method for supplying operating reserve to a utility servicing one or more service points, the method comprising:
   determining amounts of electric power stored by devices located at the one or more service points to produce stored power data;
   storing the stored power data in a repository:
   receiving communications from a first electric vehicle while the first electric vehicle is in motion and unconnected to a power grid indicating a location for the first electric vehicle and a current state of charge of the first electric vehicle;
   managing charging of a second electric vehicle at a selected one of the service points;
   determining an amount of available operating reserve based on at least the stored power data, stored energy available from the first electric vehicle, and projected energy savings resulting from a control event that interrupts the charging of the second electric vehicle by terminating the charging of the second electric vehicle prior to completion of the charging of the second electric vehicle at the selected service point;
   receiving a request for operating reserve from the utility; and
   responsive to the request for operating reserve, managing a flow of electric power from the devices to the power grid accessible by the utility, including sending a message to the selected service point to commence the control event and terminate the charging of the second electric vehicle prior to completion of the charging of the second electric vehicle at the selected service point.

2. The method of claim 1, wherein receiving a request for operating reserve comprises: receiving a command from an Automatic Generation Control (AGC) subsystem or a market signal from an independent system operator (ISO).

3. The method of claim 1, wherein when the location of the first electric vehicle is within a service area associated with the request for operating reserve and the current state of charge of the first electric vehicle indicates the first electric vehicle has excess capacity, negotiating with the first electric vehicle for dispatch of at least a portion of the excess capacity.

4. The method of claim 1, further comprising:
storing in the repository device identifiers for the devices, including the first and second electric vehicles, so as to associate each device identifier with a corresponding device;
associating in the repository each device identifier with a corresponding base service point of the one or more service points;
receiving, from a control device located at the selected service point, a device identifier for the second electric vehicle located at the selected service point and information regarding power stored and dispatched by the second electric vehicle while located at the selected service point, wherein the selected service point is not a base service point for the device identifier;
determining net carbon credits earned based on the information regarding power stored and dispatched by the second electric vehicle while located at the selected service point; and
associating the net carbon credits earned to the base service point for the device identifier.

5. The method of claim 1, further comprising:
re-commencing charging of the second electric vehicle responsive to determining that the control event at the selected service point has ended.

6. The method of claim 2, wherein at least a portion of the amount of available operating reserve is determined by a predetermined amount or percentage specified in a customer profile for a second selected service point.

7. The method of claim 1, further comprising:
prior to determining the amount of electric power stored by devices located at the one or more service points, detecting a presence of the second electric vehicle at the selected service point.

8. A method for supplying operating reserve to a utility servicing a plurality of service points, the method comprising:
determining, by a central controller, amounts of electric power stored by a plurality of devices located at the plurality of service points to produce stored power data, wherein one of the devices is a first electric vehicle located at a first service point;
storing, by the central controller, the stored power data in a repository;
managing, by the central controller, charging of a second electric vehicle at a second service point;
determining, by the central controller, an amount of available operating reserve based on at least the stored power data and projected energy savings resulting from a control event that interrupts charging of the second electric vehicle at the second service point by terminating the charging of the second electric vehicle prior to completion of the charging of the second electric vehicle;
receiving, by the central controller, a request for operating reserve from the utility; and
responsive to the request for operating reserve, managing, by the central controller, a dispatch of electric power from the plurality of devices to a power grid accessible by the utility, including:

sending a message to the first service point to dispatch electric power from the first electric vehicle, and
sending a message to the second service point to terminate the charging of the second electric vehicle prior to completion of the charging of the second electric vehicle.

9. The method of claim 8, wherein receiving a request for operating reserve comprises:
receiving a command from an Automatic Generation Control (AGC) subsystem or a market signal from an independent system operator (ISO).

10. The method of claim 8, wherein managing a dispatch of electric power from the plurality of devices to a power grid accessible by the utility comprises:
receiving, by the central controller, notifications from control devices at the plurality of service points, the notifications including information regarding amounts of power dispatched to the power grid by the plurality of devices.

11. The method of claim 8, further comprising:
determining, by the central controller, carbon credits associated with the dispatch of electric power from the plurality of devices to the power grid.

12. The method of claim 8, further comprising:
determining, by the central controller, net carbon credits earned as a result of storing power in a device of the plurality of devices and, at a later time, dispatching power from the device to the power grid; and
associating the net carbon credits earned to at least one of (a) a home or base service point for the device and (b) an owner of the device.

13. The method of claim 8, further comprising:
storing in the repository, by the central controller, device identifiers for the plurality of devices so as to associate each device identifier with a corresponding device of the plurality of devices;
associating in the repository, by the central controller, each device identifier with a corresponding base service point of the plurality of service points;
receiving, by the central controller from a control device located at a service point of the plurality of service points, a device identifier of a device of the plurality of devices located at the service point and information regarding power stored and dispatched by the device while located at the service point, wherein the service point is not the base service point for the device identifier;
determining, by the central controller, net carbon credits earned based on the information regarding power stored and dispatched by the device while located at the service point; and
associating, by the central controller, the net carbon credits earned to the base service point for the device identifier.

14. The method of claim 8, further comprising:
receiving, by the central controller, communications from a third electric vehicle while the third electric vehicle is mobile indicating a location for the third electric vehicle and a current state of charge of the third electric vehicle,
wherein determining, by the central controller, an amount of available operating reserve includes stored energy available from the third electric vehicle when the location of the third electric vehicle is within a service area associated with the request for operating reserve.

15. The method of claim 14, wherein when the location of the third electric vehicle is within a service area associated with the request for operating reserve and the current state of charge of the third electric vehicle indicates the electric vehicle has excess capacity, negotiating with the third electric vehicle for dispatch of at least a portion of the excess capacity.

16. A system for supplying operating reserve to a utility servicing one or more service points, the system comprising:
   a repository; and
   at least one processor coupled to the repository, the at least one processor operable to:
      determine amounts of electric power stored by devices located at the one or more service points to produce stored power data;
      store the stored power data in the repository;
      receive communications from a first electric vehicle while the first electric vehicle is in motion and unconnected to a power grid indicating a location for the first electric vehicle and a current state of charge of the first electric vehicle;
      manage charging of a second electric vehicle at a selected one of the service points;
      determine an amount of available operating reserve based on at least the stored power data, stored energy available from the first electric vehicle, and projected energy savings resulting from a control event that interrupts charging of the second electric vehicle by terminating the charging of the second electric vehicle prior to completion of the charging of the second electric vehicle at the selected service point;
      receive a request for operating reserve from the utility; and
      responsive to the request for operating reserve, manage a flow of electric power from the devices to the power grid accessible by the utility, including sending a message to the selected service point to commence the control event and terminate the charging of the second electric vehicle prior to completion of the charging of the second electric vehicle at the selected service point.

* * * * *